United States Patent
Sarkis et al.

(10) Patent No.: US 9,665,804 B2
(45) Date of Patent: May 30, 2017

(54) SYSTEMS AND METHODS FOR TRACKING AN OBJECT

(71) Applicant: QUALCOMM Incorporated, San Diego, CA (US)

(72) Inventors: Michel Adib Sarkis, San Diego, CA (US); Yingyong Qi, San Diego, CA (US); Magdi Abuelgasim Mohamed, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 14/539,617

(22) Filed: Nov. 12, 2014

(65) Prior Publication Data

US 2016/0133022 A1    May 12, 2016

(51) Int. Cl.
| | | |
|---|---|---|
| G06K 9/00 | (2006.01) | |
| G06K 9/78 | (2006.01) | |
| G06T 7/73 | (2017.01) | |
| G06T 7/246 | (2017.01) | |

(52) U.S. Cl.
CPC .............. *G06K 9/78* (2013.01); *G06T 7/246* (2017.01); *G06T 7/74* (2017.01); *G06T 2207/10016* (2013.01); *G06T 2207/30201* (2013.01)

(58) Field of Classification Search
None
See application file for complete search history.

(56) References Cited

U.S. PATENT DOCUMENTS

| | | | | | |
|---|---|---|---|---|---|
| 5,280,530 | A | * | 1/1994 | Trew | G01S 3/7864 348/14.16 |
| 6,064,749 | A | * | 5/2000 | Hirota | G06F 3/011 345/7 |
| 6,301,370 | B1 | * | 10/2001 | Steffens | G06K 9/00228 342/90 |
| 6,567,775 | B1 | * | 5/2003 | Maali | G06K 9/6293 704/231 |
| 6,643,387 | B1 | * | 11/2003 | Sethuraman | G06F 17/30811 348/699 |

(Continued)

FOREIGN PATENT DOCUMENTS

EP    1580684 A1    9/2005

OTHER PUBLICATIONS

International Search Report and Written Opinion—PCT/US2015/055225—ISAEPO—Feb. 2, 2016.

(Continued)

*Primary Examiner* — Shervin Nakhjavan
(74) *Attorney, Agent, or Firm* — Austin Rapp & Hardman, P.C.

(57) ABSTRACT

A method for tracking an object by an electronic device is described. The method includes detecting an object position in an initial frame to produce a detected object position. The method also includes measuring one or more landmark positions based on the detected object position or a predicted object position. The method further includes predicting the object position in a subsequent frame based on the one or more landmark positions. The method additionally includes determining whether object tracking is lost. The method also includes avoiding performing object detection for the subsequent frame in a case that object tracking is maintained.

28 Claims, 15 Drawing Sheets

(56) References Cited

U.S. PATENT DOCUMENTS

| | | | |
|---|---|---|---|
| 7,428,315 B2* | 9/2008 | Rui | G06K 9/00234 |
| | | | 382/103 |
| 7,508,990 B2 | 3/2009 | Pace et al. | |
| 7,860,162 B2 | 12/2010 | Yokomitsu et al. | |
| 8,396,268 B2 | 3/2013 | Zabair et al. | |
| 8,570,371 B2 | 10/2013 | Yamashita | |
| 2001/0033675 A1* | 10/2001 | Maurer | G06K 9/00228 |
| | | | 382/103 |
| 2003/0095140 A1* | 5/2003 | Keaton | G06F 3/011 |
| | | | 715/700 |
| 2005/0280711 A1* | 12/2005 | Ishii | H04N 5/232 |
| | | | 348/207.99 |
| 2007/0092110 A1* | 4/2007 | Xu | G06T 7/2033 |
| | | | 382/103 |
| 2009/0110237 A1* | 4/2009 | Wang | G06K 9/00355 |
| | | | 382/103 |
| 2009/0116749 A1* | 5/2009 | Cristinacce | G06K 9/621 |
| | | | 382/195 |
| 2009/0175496 A1* | 7/2009 | Kondo | G06K 9/32 |
| | | | 382/103 |
| 2010/0045799 A1* | 2/2010 | Lei | G06K 9/00369 |
| | | | 348/169 |
| 2011/0081043 A1* | 4/2011 | Sabol | G06T 7/2053 |
| | | | 382/103 |
| 2012/0105647 A1* | 5/2012 | Yoshizumi | G03B 17/38 |
| | | | 348/169 |
| 2013/0215148 A1* | 8/2013 | Antonyuk | G06T 19/006 |
| | | | 345/633 |
| 2013/0230240 A1* | 9/2013 | Muninder | G06K 9/00234 |
| | | | 382/165 |
| 2013/0272570 A1 | 10/2013 | Sheng et al. | |
| 2014/0205141 A1 | 7/2014 | Gao et al. | |

OTHER PUBLICATIONS

Reynard D., et al., "Learning Dynamics of Complex Motions from Image Sequences," Apr. 15, 1996, (Apr. 15, 1996), Computer Vision ECCV 1996, Springer Berlin Heidelberg, Berlin, Heidelberg, pp. 357-368, XP019190191, ISBN: 978-3-540-61122-6, Abstract, figure 4, Section 2.

Yilmaz A., et al., "Object tracking", ACM Computing Surveys, vol. 38, No. 4, Dec. 25, 2006 (Dec. 25, 2006), pp. 1-45, XP055053833, ISSN: 0360-0300, DOI:10.1145/1177352.1177355, the whole document.

Blake A et al: "A Framework for Spatiotemporal Control in the Tracking of Visual Contours", International Journal of Computer Vision, Kluwer Academic Publishers, Norwell, US, vol. 11, No. 2, Oct. 1, 1993 (Oct. 1, 1993 ), pp. 127-145, XP001160724, ISSN: 0920-5691, DOI: 10.1007/BF01469225.

\* cited by examiner

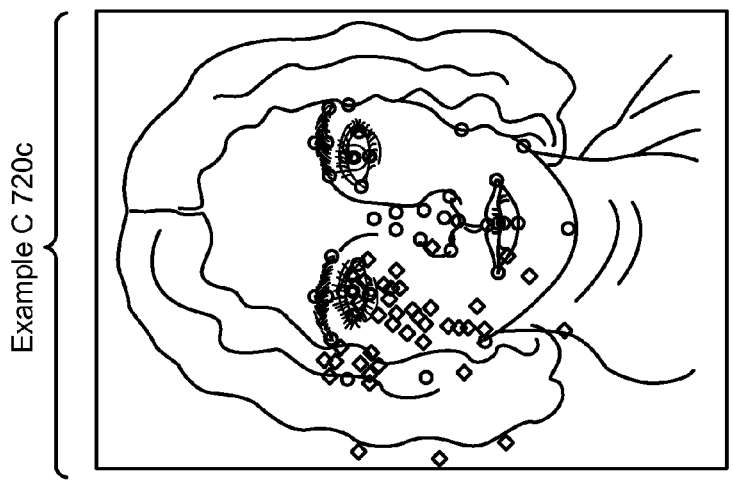
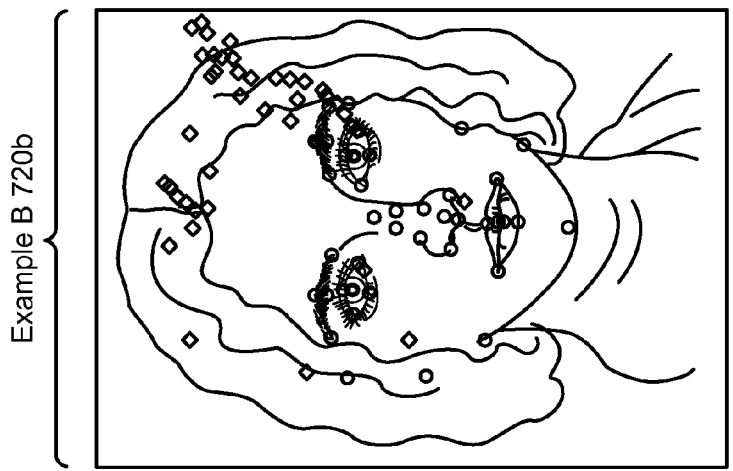
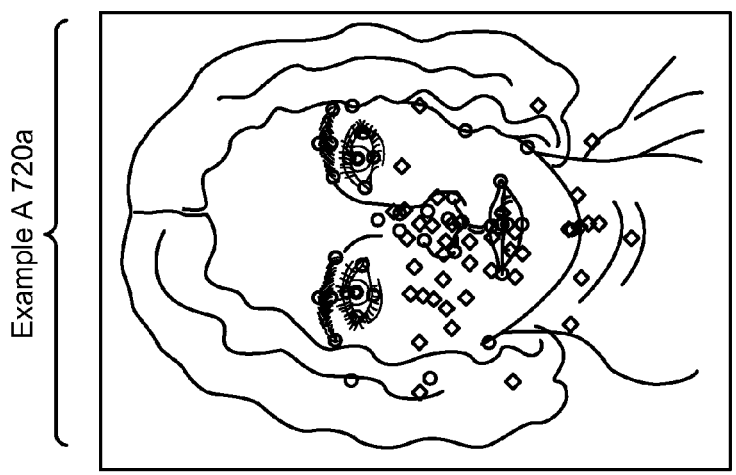
FIG. 7

SYSTEMS AND METHODS FOR TRACKING AN OBJECT

TECHNICAL FIELD

The present disclosure relates generally to electronic devices. More specifically, the present disclosure relates to systems and methods for tracking an object.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or more reliably are often sought after.

Some electronic devices utilize images. For example, a smartphone may capture and process a digital image. However, processing images may involve complex operations that require significant resources (e.g., time and power). As can be observed from this discussion, systems and methods that improve image processing may be beneficial.

SUMMARY

A method for tracking an object by an electronic device is described. The method includes detecting an object position in an initial frame to produce a detected object position. The method also includes measuring one or more landmark positions based on the detected object position or a predicted object position. The method further includes predicting the object position in a subsequent frame based on the one or more landmark positions. The method additionally includes determining whether object tracking is lost. The method also includes avoiding performing object detection for the subsequent frame in a case that object tracking is maintained. Determining whether object tracking is lost may be based on at least one of one or more landmark positions and object position prediction. The method may operate on one frame at a time of a single image sequence.

Object position detection and object position prediction may be independent. Predicting the object position may be based on one or more landmark positions from a previous frame. A structure of the landmark positions may be predefined. The landmark positions may be within a structure of the object.

A velocity model may be utilized during prediction and a displacement model may be utilized during measurement. Each of the velocity model and displacement model may correspond to a structure of the object. The velocity model and the displacement model may not include any hard constraints.

The method may include training a velocity model for object position prediction from landmarks of a previous frame. The method may include training a displacement model for landmark measurement from a predicted bounding box position at a current frame or from a detected bounding box position at the current frame.

An electronic device for tracking an object is also described. The electronic device includes a processor and memory in electronic communication with the processor. The electronic device also includes instructions stored in the memory. The instructions are executable by the processor to detect an object position in an initial frame to produce a detected object position. The instructions are also executable by the processor to measure one or more landmark positions based on the detected object position or a predicted object position. The instructions are further executable by the processor to predict the object position in a subsequent frame based on the one or more landmark positions. The instructions are additionally executable by the processor to determine whether object tracking is lost. The instructions are also executable by the processor to avoid performing object detection for the subsequent frame in a case that object tracking is maintained.

A computer-program product for tracking an object is also described. The computer-program product includes a non-transitory tangible computer-readable medium with instructions. The instructions include code for causing an electronic device to detect an object position in an initial frame to produce a detected object position. The instructions also include code for causing the electronic device to measure one or more landmark positions based on the detected object position or a predicted object position. The instructions further include code for causing the electronic device to predict the object position in a subsequent frame based on the one or more landmark positions. The instructions additionally include code for causing the electronic device to determine whether object tracking is lost. The instructions also include code for causing the electronic device to avoid performing object detection for the subsequent frame in a case that object tracking is maintained.

An apparatus for tracking an object is also described. The apparatus includes means for detecting an object position in an initial frame to produce a detected object position. The apparatus also includes means for measuring one or more landmark positions based on the detected object position. The apparatus further includes means for predicting the object position in a subsequent frame based on the one or more landmark positions. The apparatus additionally includes means for determining whether object tracking is lost. The apparatus also includes means for avoiding performing object detection for the subsequent frame in a case that object tracking is maintained.

BRIEF DESCRIPTION OF THE DRAWINGS

FIG. 7 includes three examples that illustrate landmark motion;

DETAILED DESCRIPTION

Figure 1:
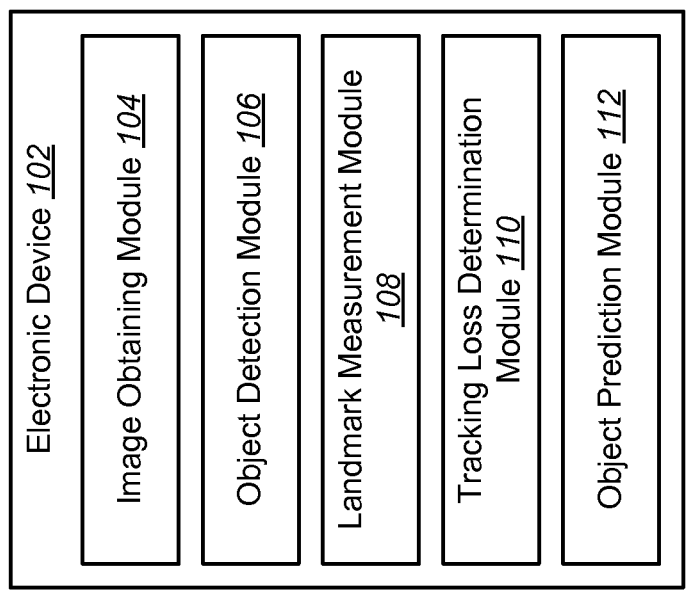
FIG. 1 is a block diagram illustrating one configuration of an electronic device in which systems and methods for tracking an object may be implemented.

Systems and methods for tracking an object are described herein. For example, the systems and methods disclosed herein may be implemented for tracking one or more objects in a series of images (e.g., video, monocular video, etc.). In some configurations, tracking may be performed via a controlled cascade of sequential sampling filters.

In known approaches, object tracking mechanisms require combining an object detector with a tracking filter like a Kalman filter, a particle filter or a mean-shift filter in order to maintain temporal smoothness and improve accuracy. These approaches may require a high computational demand as object detection at multiple resolutions and various poses is a very expensive task.

In some configurations, a controlled cascade of sequential sampling filters may be utilized to overcome this problem. The systems and methods disclosed herein do not require always or regularly using an object detector. In some configurations, the systems and methods disclosed herein may start by using an object detector and then may rely solely on a tracking mechanism afterwards (so long as tracking is not lost, for example). In addition, the systems and methods disclosed herein may intelligently and automatically detect if the object under consideration has been lost. In this case, tracking may automatically reinitialize using the object detector and then continue tracking. Some configurations of the systems and methods disclosed herein may be automatic and do not require any manual intervention. Some of the concepts may be described herein using a human face as an example object. It should be noted, however, that the systems and methods disclosed herein may be applied to other objects. For example, the systems and methods disclosed herein may be applied to any object having a structure or pattern of recognizable landmarks. Analysis, comparisons and tests are also presented herein.

The systems and methods disclosed herein may enable landmark tracking. A landmark is a location or point on an object or shape. In some configurations, a set of landmarks may be defined for a particular object. For example, a set of landmarks for one or more faces may include eye corners, irises, lip corners, nose corners, ear corners, facial contour points, etc. It should be noted that the systems and methods disclosed herein may be applied in other contexts. For example, a set of landmarks may include a set of vertices on a deformable or non-deformable shape or object (e.g., human faces, full human bodies, boxes, triangles, letters, cars, etc.).

In some configurations, the systems and methods disclosed herein may be applied to facial tracking. Assuming a face is detected, locating the corresponding dense facial landmarks may be utilized for many applications. Examples of applications include auto-focus, white balance, facial recognition, face transformation and/or morphing such as beautification, face orientation estimation for an auto-related application, model based video coding and avatar-based video telephony, etc. The systems and methods disclosed herein compare favorably to known approaches.

The problem definition for facial tracking is described as follows. As a face is moving in images (e.g., video), it is imposed to various transformations. Transformations may include global translation, global scaling and affine transformation (e.g., global rotation and local motion or deformation). In tracking a face using some of the standard tracking approaches (e.g., particle filters, Kalman filters, etc.), a face detector always needs to be employed. This can render computations very costly. In addition, the face detector output in known approaches may not be temporally smooth. Another known approach for tracking a face (e.g., Optical Flow) may have to regularly employ a face detector.

Some configurations of the systems and methods disclosed herein may address these problems through a controlled cascade of sequential sampling filters. An approach utilizing a controlled sequential sampling filter may include one or more aspects of prediction, measurement and control.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of an electronic device 102 in which systems and methods for tracking an object may be implemented. Examples of the electronic device 102 include smartphones, cameras (e.g., still cameras, video cameras, etc.), computers (e.g., desktop computers, laptop computers, etc.), tablet devices, cellular phones, televisions, gaming systems, appliances, etc. The electronic device 102 may include an image obtaining module 104, an object detection module 106, a landmark measurement module 108, a tracking loss determination module 110 and/or an object prediction module 112. A "module" may be implemented in hardware (e.g., circuitry) or a combination of hardware and software (e.g., a processor with instructions). One or more of the modules 104, 106, 108, 110, 112 may be implemented in a tracker.

The image obtaining module 104 may obtain an image (e.g., digital image). For example, the image obtaining module 104 may capture one or more images (e.g., video) using one or more image sensors and/or cameras. The image sensor(s) and/or camera(s) may be included in the electronic device 102 and/or coupled to the electronic device 102. Additionally or alternatively, the image obtaining module 104 may receive the one or more images (e.g., video) from another device (e.g., a memory card, an external storage device, a web camera, a digital camera, a smartphone, a computer, a video camera, etc.). The one or more images may be video frames. For example, each image in the one or more images obtained by the image obtaining module 104 may be a frame in a sequence of images (e.g., video).

The electronic device 102 may perform one or more operations on an initial frame. An "initial frame" may be an initial frame or image in a sequence of frames or images (e.g., video). The object detection module 106 may detect an object position in the initial frame to produce a detected object position. For example, the object detection module 106 may determine a location (e.g., a center point) and size of a bounding box that indicates the position and size of an object. Some object detectors are known in the art. For faces, examples include the Viola-Jones detector, the OMRON face detector and others. For a general object detector, examples include approaches like deformable parts models that can be adapted to various objects (e.g., persons, bikes, cars, etc.). These schemes may compute a feature descriptor (e.g., histogram of signs of gradients (HSG), histogram of oriented gradients (HOG), scale-invariant feature transform (SIFT), speeded up robust features (SURF), gradient location and orientation histogram (GLOH), Bag of Words (BoW), etc.) in various image locations. These schemes may find the locations that most likely correspond to the object under study using a machine learning method (e.g., Support Vector Machines, Boosting, Dynamic Programming, etc.).

For the initial frame, the landmark measurement module 108 may measure one or more landmark positions based on the detected object position. For example, the landmark measurement module 108 may determine positions of a set of landmarks corresponding to an object in the image. In some configurations, measuring the one or more landmark positions may be based on a bounding box determined by the object detection module 106. For instance, in initial frames or in frames where tracking is lost, the object detection module 106 may determine a bounding box. The bounding box may be utilized to measure the one or more landmark positions. In some configurations, in frames where tracking is maintained (e.g., in one or more frames after the initial frame), the object detection module 106 may not perform object detection. In this case, the landmarks may be measured based on a bounding box determined by the object prediction module 112, for example.

In some configurations, the tracking loss determination module 110 may not determine whether object tracking is lost for the initial frame. In an initial frame, for example, tracking may not be lost because object detection is being performed by the object detection module 106 (e.g., object detector).

The electronic device 102 may perform one or more operations for one or more subsequent frames (e.g., one or more frames after the initial frame). The object prediction module 112 may predict the object position in a subsequent frame based on the one or more landmark positions. For example, the object prediction module 112 may determine a face position in a frame at time k given its previous landmark positions (in frame k−1, for example). In some configurations, object position prediction may be carried out in accordance with Equation (1).

$$p_k = g(p_{k-1}) + \epsilon = w^T \cdot f(l_{k-1}) + \epsilon \qquad (1)$$

As used herein, p is an object position vector (e.g., face position vector, center of a face bounding box, etc.), l is a landmark positions vector, $f$ and g are non-linear functions, $\epsilon$ is process noise, w is a weight vector, T denotes the transpose operator and k is a frame number.

In some configurations, the object prediction module 112 may predict an object position (e.g., face bounding box) in accordance with the following. The objective is to estimate the new object position (e.g., face position) given the estimate of its landmarks in the previous frame. The following non-linear velocity model may be assumed as provided in Equation (2).

$$l_k = f(l_{k-1}) = l_{k-1} + M(l_{k-1}) \cdot \Phi(l_{k-1}) \cdot \Delta k + \epsilon \qquad (2)$$

As used herein, $\epsilon$ represents process noise, k is a time or frame number and $\Delta k$ is a time step or number of frames (which may be 1 in some configurations). A displacement $\Delta l_k$ of each landmark is a function of the feature descriptor $\Phi(l_{k-1})$ at the landmark multiplied by $M(l_{k-1})$, which represents the velocity model of the landmark from time k−1 to time k. Examples of feature descriptors may include histogram of signs of gradients (HSG), histogram of oriented gradients (HOG), scale-invariant feature transform (SIFT), Hough transform, speeded up robust features (SURF), gradient location and orientation histogram (GLOH), etc. The quantity $M(l_{k-1}) \cdot \Phi(l_{k-1}) \cdot \Delta k$ may represent a displacement $\Delta l_k$ in pixels and the quantity $M(l_{k-1}) \cdot \Phi(l_{k-1})$ may represent a velocity (in pixels/time step $\Delta k$).

One problem with this expression is that both $l_k$ and $M(l_{k-1})$ may be unknown. One solution to this problem is that if it is assumed that $l_k$ is known through annotated data, $M(l_{k-1})$ may be learned offline. For example, $M(l_{k-1})$ may be obtained during training by solving Equation (3), for example.

$$\min_{M(l_{k-1})} \|M(l_{k-1}) \cdot \Phi(l_{k-1}) + l_{k-1} - l_k\|_2^2 + \gamma \|M(l_{k-1}) - M^*(l_{k-1})\|_2^2 \qquad (3)$$

As used herein, $\gamma$ is a pre-assigned weighting factor and $\| \|_2$ denotes the $l^2$ norm. It should be noted that other cost functions with a minimum may be alternatively utilized (e.g., using $l^2$ norm or absolute value instead of the squared $l^2$ norm, etc.). Additional detail regarding training is given below in connection with FIGS. 5-8.

More detail regarding the HSG feature descriptor is given as follows. As described above, HSG is one example of a feature descriptor that may be utilized in accordance with the systems and methods disclosed herein. The basic idea of the HSG is to use the sign of edge components in an orthonormal basis. For example, gradients of an image (e.g., image frame) may be computed (using Sobel operators, Sharr operators or another approach, for example). Each of the edge sign components may be either positive or negative. Accordingly, there are four possibilities for each pixel for two directional edges (e.g., dimensions). In particular, the gradient of each pixel in each dimension may have a sign (positive "+" or negative "−"). These may be coded in four different values (e.g., −− is coded as 0, +− is coded as 1, ++ is coded as 2 and −+ is coded as 3). In some configurations, an additional dimension (e.g., 45 degrees) may be coded.

The landmark measurement module 108 may measure one or more landmark positions (in the subsequent frame based on the predicted face position, for example). In some configurations, the landmark measurement module 108 may measure the new positions of the landmarks given the predicted object position in accordance with Equation (4).

$$l_k = h(p_k) + \sigma \qquad (4)$$

As used herein, h is a non-linear function and $\sigma$ is process noise.

In some configurations, the one or more landmarks may be measured in accordance with the following. With the predicted object position (e.g., bounding box), the one or more landmarks (e.g., facial landmarks) may be measured starting from a mean shape (ms). A non-linear displacement model may be assumed as provided in Equation (5).

$$l_k = h(p_k) = l_{k,ms} + U(l_{k,ms}) \cdot \Phi(l_{k,ms}) + \sigma \qquad (5)$$

As used herein, $\sigma$ represents process noise, $l_{k,ms}$ is the landmark position at mean shape (ms) in frame k and $U(l_{k,ms})$ is the displacement model of the landmark from mean shape position at the predicted bounding box. It should be noted that similar derivations as in prediction for training and online measurement can be done. For example, the displacement model may be trained as described in connection with FIG. 15.

In some configurations, a displacement model may be trained for landmark measurement. For example, a displacement model may be trained for landmark measurement based on a predicted object position (e.g., predicted bounding box position) at a current frame (e.g., image) or based on a measured or detected object position (e.g., detected bounding box position) at the current frame (e.g., image). The measured or detected bounding box position may be provided by the object detection module 106 (e.g., object detector). The predicted bounding box position may be provided by the object prediction module 112. Accordingly, landmarks may be measured from a detected object position or a predicted object position by using the trained velocity model (from Equation (2), for example).

The training of any of the displacement and/or velocity models may be performed by the electronic device 102 in some configurations. For example, the electronic device 102 may include a displacement model training module that may be separate from or included within one or more of the modules described in connection with FIG. 1. In some configurations, a displacement model for landmark measurement may be trained as described in connection with one or more of FIGS. 9 and 15. Additionally or alternatively, the electronic device 102 may include a velocity model training module that may be separate from or included within one or more of the modules described in connection with FIG. 1. In some configurations, a velocity model for object position prediction may be trained as described in connection with FIG. 5.

The tracking loss determination module 110 may determine whether object tracking is lost. This may provide an aspect of control by estimating whether tracking is lost. For example, the tracking loss determination module 110 may determine whether the one or more landmark positions likely correspond to the object or not. In some configurations, the tracking loss determination module 110 may determine a degree to which one or more of the one or more landmark positions conform to a statistical model corresponding to a structure of the object. If the one or more landmark positions reflect a low probability for conformance to the model, the tracking loss determination module 110 may determine that tracking has been lost. For example, the tracking loss determination module 110 may determine whether the probability of conformance is below a probability threshold.

In some configurations, the statistical model may be based on one or more statistical distributions corresponding to one or more landmark attributes (e.g., local motion of landmarks, statistics of shape dynamics, etc.). For example, the model may be based on a distribution for global translation, a distribution for global scale and/or a distribution for global rotation. For instance, the model may be based on a Gaussian distribution assuming a 15% standard deviation for global translation and Gaussian distribution assuming a 5% standard deviation for global scale. In some implementations, if the landmarks in the current frame indicate a global translation greater than 15% and/or global scaling greater than 5%, the tracking loss determination module 110 may determine that tracking has been lost.

In a case that object tracking is maintained (e.g., not lost), the electronic device 102 may avoid performing object detection for the subsequent frame. For example, the electronic device 102 (e.g., object detection module 106) may not perform object detection for the subsequent frame if object tracking is maintained. In this way, for instance, object position prediction may be utilized instead of object position detection when tracking is maintained. This approach may offer improved accuracy with good efficiency.

In a case that tracking is lost, the object detection module 106 may detect (e.g., redetect) an object position (e.g., face position). For example, in a case that object tracking is lost (e.g., if the tracking loss determination module 110 indicates that object tracking is lost), the object detection module 106 may detect the object position in the subsequent frame.

In comparison with known approaches, the systems and methods disclosed herein may provide one or more distinct features, which are described as follows. In some configurations, object detection and object prediction are independent. For example, object position detection may not be performed for frames where object prediction has maintained object tracking. Accordingly, object detection may not be performed after the initial frame so long as object tracking is maintained. Furthermore, object detection may replace object prediction for frames where object tracking is lost. For example, only one of the object prediction or object detection will ultimately provide the object position (e.g., $p_k$) used for landmark measurement in each frame. Accordingly, the object detection module 106 (e.g., face detector) may only be called when needed. Another distinct feature may be that the electronic device 102 (e.g., tracking loss determination module 110) can detect whether object tracking is lost. Another distinct feature may be that landmarks may be used for object position prediction (e.g., face pose prediction).

Figure 2:
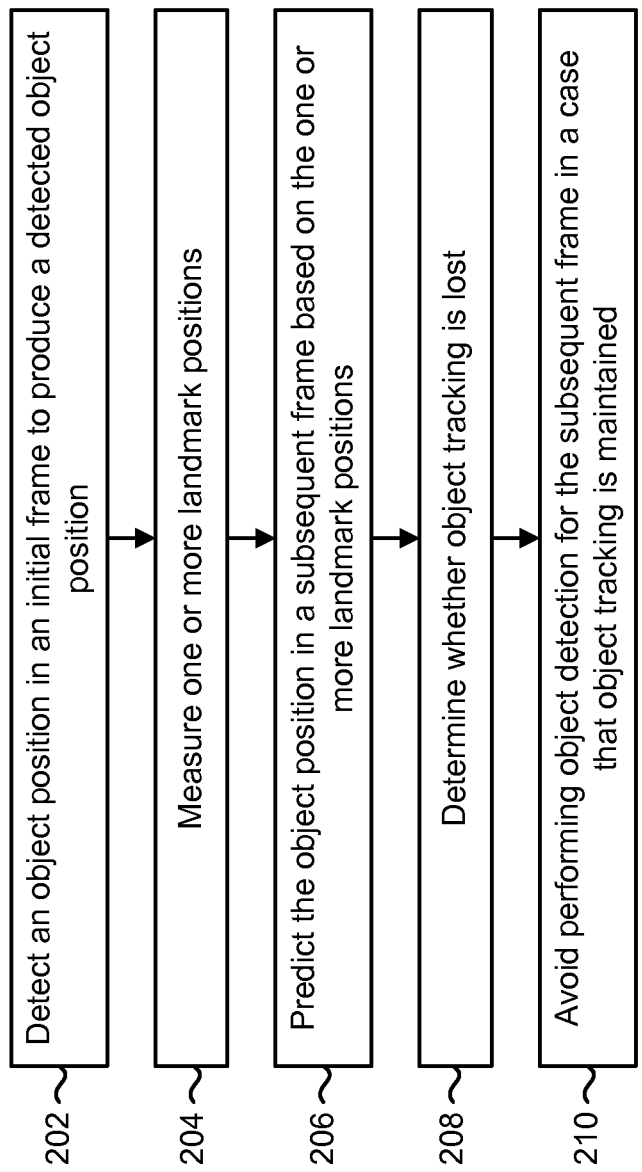
FIG. 2 is a flow diagram illustrating one configuration of a method for tracking an object.

FIG. 2 is a flow diagram illustrating one configuration of a method 200 for tracking an object. The method 200 may be performed by the electronic device 102. The electronic device 102 may detect 202 an object position in an initial frame to produce a detected object position. This may be accomplished as described above in connection with FIG. 1.

The electronic device 102 may measure 204 one or more landmark positions. This may be accomplished as described above in connection with FIG. 1. In an initial frame, for example, the electronic device 102 may measure 204 one or more landmark positions based on the detected object position. In a subsequent frame where object tracking is maintained, for example, the electronic device 102 may measure 204 one or more landmark positions based on a predicted object position. In a subsequent frame where object tracking is lost, for example, the electronic device 102 may measure 204 one or more landmark positions based on a detected (e.g., redetected) object position.

In some configurations, the landmark positions may be within a structure of the object. For example, each landmark position may be associated with a particular point on a structure (e.g., facial structure, shape, etc.). A structure of the landmark positions may be predefined. For example, a particular structure (e.g., facial structure, shape, etc.) may be predefined before initiating object tracking. Specifically, a certain structure (e.g., facial structure, iris, hands, box, triangle, pattern, etc.) may be predefined for tracking before runtime.

The electronic device 102 may predict 206 the object position in a subsequent frame based on the one or more landmark positions. This may be accomplished as described above in connection with FIG. 1. For example, the electronic device 102 may predict 206 the object position (e.g., face position vector, bounding box, etc.) based on a non-linear function of the landmark positions and a weight vector.

Predicting 206 the object position may be based on the one or more landmark positions from a previous frame (e.g., k−1).

The electronic device 102 may determine 208 whether object tracking is lost. This may be accomplished as described above in connection with FIG. 1. Determining 208 whether object tracking is lost may be based on one or more landmark positions and/or object position prediction. For example, the electronic device 102 may determine whether one or more landmark attributes (e.g., global translation, global scale, global rotation, etc.) are beyond one or more thresholds (e.g., global translation greater than 15% and/or global scaling greater than 5%). Additionally or alternatively, the electronic device 102 (e.g., tracking loss determination module 110) may determine a combined probability (based on global translation, global scale and/or global rotation, etc., for example) that the predicted object position corresponds to the object. Alternatively, a combined probability may be determined from measured landmarks based on the predicted object position, for example. If the combined probability is above (e.g., greater than or equal to) a probability threshold, the electronic device 102 (e.g., tracking loss determination module 110) may determine that tracking is maintained. If the combined probability is below (e.g., less than) a probability threshold, the electronic device 102 (e.g., tracking loss determination module 110) may determine that tracking is lost.

The electronic device 102 may avoid 210 performing object detection for the subsequent frame in a case that object tracking is maintained. This may be accomplished as described above in connection with FIG. 1. For example, the electronic device 102 may not perform object detection for the subsequent frame in a case that object tracking is maintained. In a case that object tracking is lost, the electronic device 102 may detect (e.g., redetect) the object position for the subsequent frame. Accordingly, the electronic device 102 may not return to detect an object position as long as tracking is maintained. In other words, the electronic device 102 may not detect an object position for any subsequent frame unless object tracking is lost.

It should be noted that one or more of the steps of the method 200 may be performed in different orders. In one configuration, for example, the electronic device 102 may determine 208 whether object tracking is lost after object position prediction but before landmark measurement for a frame. In another configuration, the electronic device 102 may determine 208 whether object tracking is lost after landmark measurement for a frame. In yet another configuration, the electronic device 102 may determine 208 whether object tracking is lost both after object position prediction and after landmark measurement.

It should also be noted that a model may be utilized during tracking. The model may correspond to a structure of the object. For example, an object may have a particular structure (e.g., facial structure, shape, etc.) that may be modeled. Specifically, the object structure may be modeled with a set of landmarks having established positional relationships between each other. In some configurations, the positional relationships may be defined in terms of one or more probability distributions (e.g., conditional probabilities of the position of one landmark in relation to the position of another landmark). In some configurations, the model may not include any hard constraints (e.g., active shape and/or appearance models). The model may be defined in terms of soft statistics (e.g., probability distributions).

In some configurations, the method 200 may operate on a single image sequence (e.g., one video). In some examples, the method 200 may operate on one frame at a time of the single image sequence. For instance, an object position may be detected 202, landmark positions may be measured 204, the object position may be predicted 206 and/or it may be determined 208 whether object tracking is lost only on one frame at a time.

In some configurations, the method 200 may include training a velocity model for object position prediction from landmarks of a previous frame and/or for tracking. The training may be performed offline (e.g., before runtime) in some approaches.

In some configurations, the method 200 may include training a displacement model for landmark measurement based on a predicted bounding box position at a current frame or from a detected bounding box position at the current frame. This may be accomplished as described in connection with FIG. 1, for example.

Figure 3:
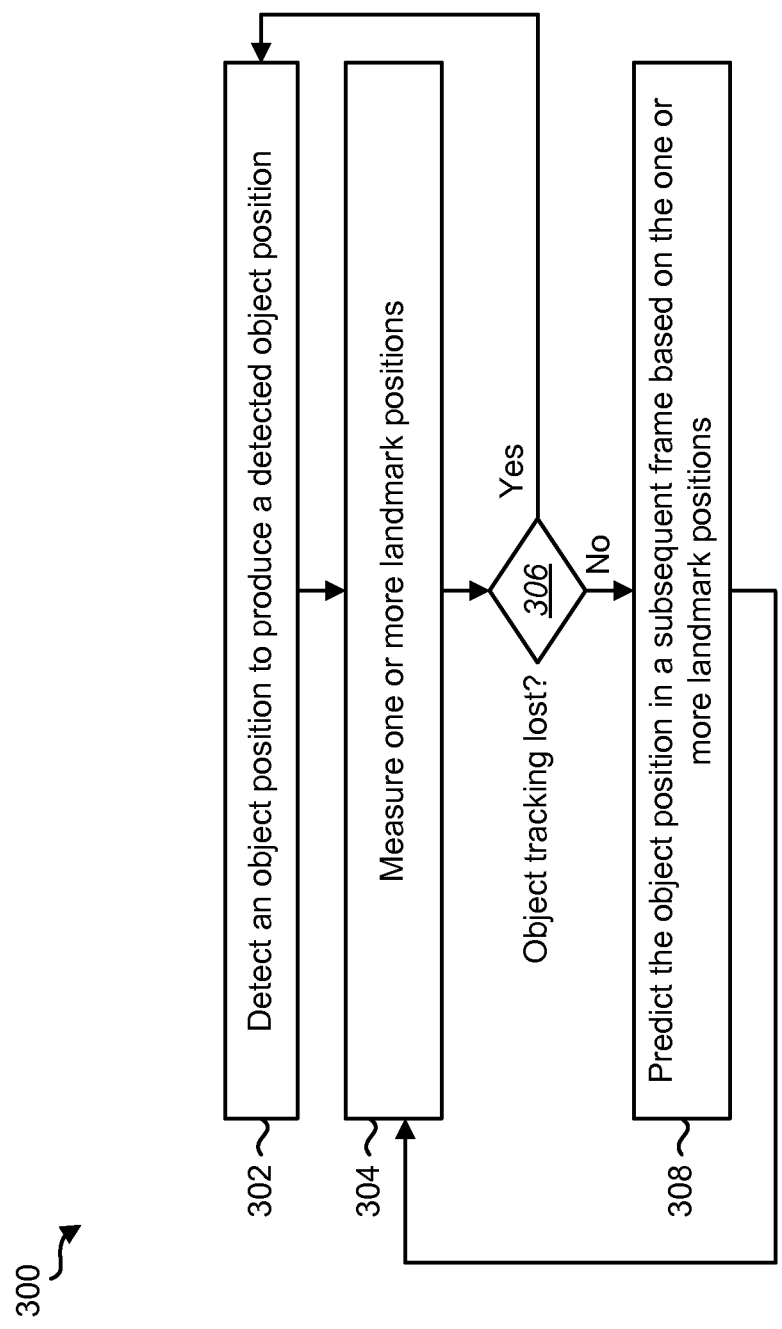
FIG. 3 is a flow diagram illustrating a more specific configuration of a method for tracking an object.

FIG. 3 is a flow diagram illustrating a more specific configuration of a method 300 for tracking an object. The method 300 described in connection with FIG. 3 may be one example of the method 200 described in connection with FIG. 2. The method 300 may be performed by the electronic device 102. The electronic device 102 may detect 302 an object position to produce a detected object position. This may be accomplished as described above in connection with one or more of FIGS. 1-2. In some configurations, the electronic device 102 may detect an object position $p_k$ for a frame k.

The electronic device 102 may measure 304 one or more landmark positions. This may be accomplished as described above in connection with one or more of FIGS. 1-2. In an initial frame, for example, the electronic device 102 may measure 304 one or more landmark positions based on the detected object position (e.g., bounding box) for the initial frame. In a subsequent frame (e.g., any frame after the initial frame) where object tracking is maintained, for example, the electronic device 102 may measure 304 one or more landmark positions based on a predicted object position. In a subsequent frame where object tracking is lost, for example, the electronic device 102 may measure 304 one or more landmark positions based on a detected (e.g., redetected) object position.

The electronic device 102 may determine 306 whether object tracking is lost. This may be accomplished as described above in connection with FIG. 1. For example, the electronic device 102 may determine 306 whether object tracking is lost based on one or more landmark positions. For example, the electronic device 102 may determine 306 whether object tracking is lost based on one or more landmark attributes (e.g., global translation, global scale, global rotation, etc.) as described above in connection with one or more of FIGS. 1-2. It should be noted that, in some configurations, determining 306 whether object tracking is lost may be skipped (e.g., not performed) for the initial frame and/or for frames where object detection has been performed.

In a case that object tracking is maintained (e.g., object tracking is not lost), the electronic device 102 may avoid performing object detection for the subsequent frame. As illustrated in the configuration in FIG. 3, the electronic device 102 may predict 308 the object position in a subsequent frame based on the one or more landmark positions. This may be accomplished as described above in connection with one or more of FIGS. 1-2. For example, the electronic device 102 may predict 308 the object position (e.g., face position vector, bounding box, etc.) based on a non-linear function of the landmark positions and a weight vector. The electronic device 102 may return to measure 304 one or more landmark positions (for the subsequent frame) without returning to detect 302 an object position. Accordingly, the electronic device 102 may not return to detect 302 an object position as long as tracking is maintained. In other words, the electronic device 102 may not detect an object position for any subsequent frame unless object tracking is lost. In some configurations, the frame may increment (e.g., k=k+1) upon determining that object tracking is maintained. Accordingly, predicting 308 the object position in a subsequent frame (e.g., object position $p_k$ for the subsequent frame k.) may be based on the one or more landmark positions $l_{k-1}$. In a case that object tracking is lost, the electronic device 102 may return to detect 302 (e.g., redetect) the object position for the subsequent frame.

Figure 4:
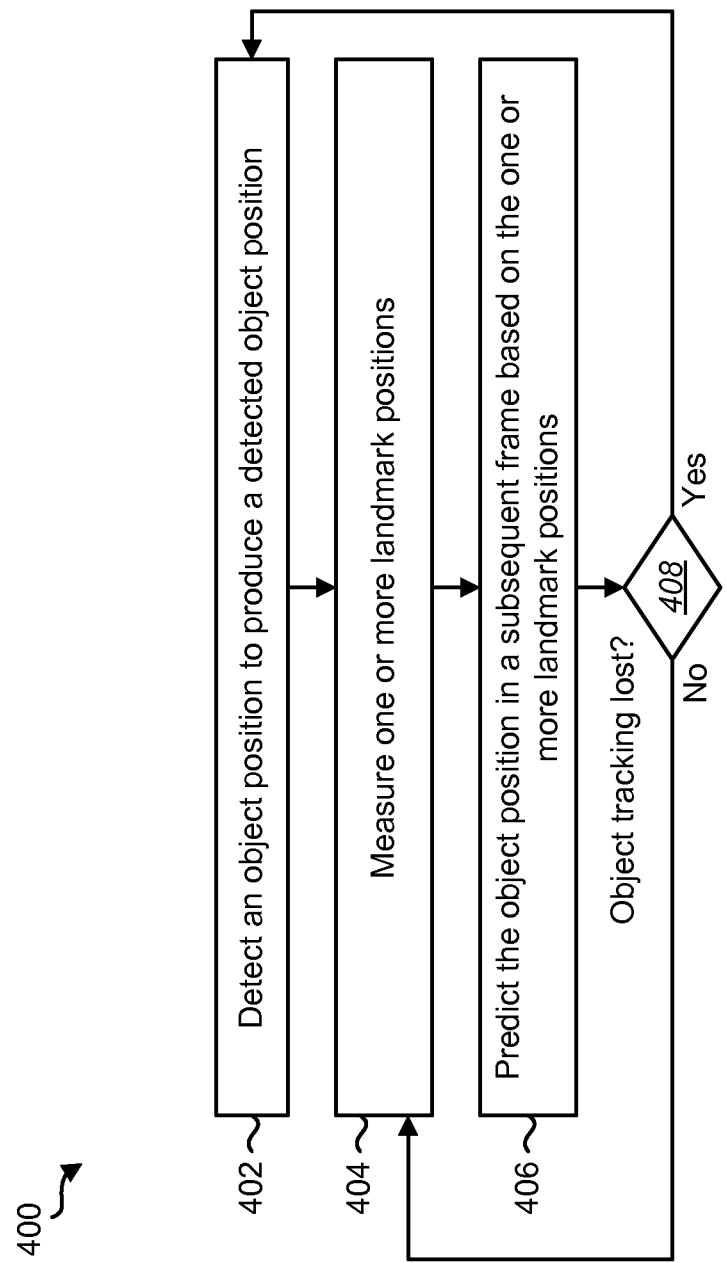
FIG. 4 is a flow diagram illustrating another more specific configuration of a method for tracking an object.

FIG. 4 is a flow diagram illustrating another more specific configuration of a method 400 for tracking an object. The method 400 described in connection with FIG. 4 may be one example of the method 200 described in connection with FIG. 2. The method 400 may be performed by the electronic device 102. The electronic device 102 may detect 402 an object position to produce a detected object position. This may be accomplished as described above in connection with one or more of FIGS. 1-2.

The electronic device 102 may measure 404 one or more landmark positions. This may be accomplished as described above in connection with one or more of FIGS. 1-2. In an initial frame, for example, the electronic device 102 may measure 404 one or more landmark positions based on the detected object position for the initial frame. In a subsequent frame (e.g., any frame after the initial frame) where object tracking is maintained, for example, the electronic device 102 may measure 404 one or more landmark positions based on a predicted object position. In a subsequent frame where object tracking is lost, for example, the electronic device 102 may measure 404 one or more landmark positions based on a detected (e.g., redetected) object position. In some configurations, the method 400 may advance to the next frame (e.g., k=k+1) after measuring 404 the one or more landmark positions (and before predicting 406 the object position, for example).

As illustrated in the configuration in FIG. 4, the electronic device 102 may predict 406 the object position in a subsequent frame based on the one or more landmark positions. This may be accomplished as described above in connection with one or more of FIGS. 1-2. For example, the electronic device 102 may predict 406 the object position (e.g., face position vector, bounding box, etc.) based on a non-linear function of the landmark positions and a weight vector.

The electronic device 102 may determine 408 whether object tracking is lost. This may be accomplished as described above in connection with one or more of FIGS. 1-2. For example, the electronic device 102 may determine 408 whether object tracking is lost based on the one or more landmark positions and/or based on the predicted object position (that is based on the one or more landmark positions, for example). For instance, the electronic device 102 may determine 408 whether object tracking is lost based on one or more landmark attributes (e.g., global translation, global scale, global rotation, etc.) as described above in connection with one or more of FIGS. 1-2. Additionally or alternatively, the electronic device 102 may determine 408 whether object tracking is lost based on the predicted object position (e.g., bounding box).

In a case that object tracking is maintained (e.g., object tracking is not lost), the electronic device 102 may avoid performing object detection for the subsequent frame. The electronic device 102 may return to measure 404 one or more landmark positions (for the subsequent frame) without returning to detect 402 an object position. Accordingly, the electronic device 102 may not return to detect 402 an object position as long as tracking is maintained. In other words, the electronic device 102 may not detect an object position for any subsequent frame unless object tracking is lost. In a case that object tracking is lost, the electronic device 102 may return to detect 402 (e.g., redetect) the object position for the subsequent frame.

In some configurations, if object tracking is lost, the electronic device 102 may detect 402 the object position for the same frame. In other configurations, if object tracking is lost, the electronic device 102 may move to the next frame (and detect 402 an object position for the next frame, for example). In some implementations, both options may be provided. For example, it may be adjustable or selectable (by a user and/or based on a user input, for example) whether the electronic device 102 detects 402 the object position in the same frame where tracking has been lost or whether the electronic device 102 moves to the next frame (and detects 402 the object position for the next frame, for example). It should be noted that if the object leaves the frame, tracking may be lost. In this scenario, the electronic device 102 may attempt to detect the object (e.g., a new object) using an object detector (e.g., object detection module 106). This may occur in one or more subsequent frames. Once an object is detected, tracking may be reinitialized (e.g., object position prediction may be attempted for one or more subsequent frames).

It should be noted that in some configurations, the approaches described in connection with FIGS. 3-4 may be combined. For example, the electronic device 102 could determine whether tracking was lost both following object position prediction and following landmark measurement.

Figure 5:
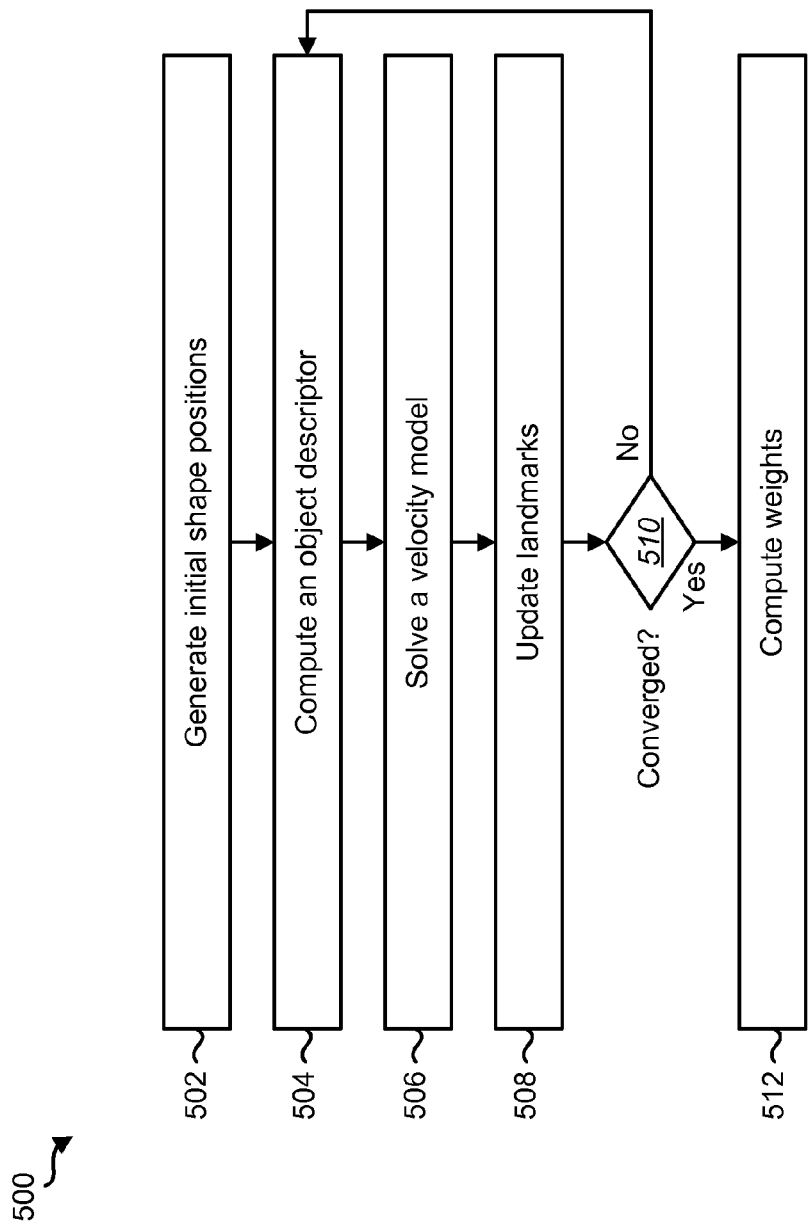
FIG. 5 is a flow diagram illustrating one configuration of a method for training for predicting an object position.

FIG. 5 is a flow diagram illustrating one configuration of a method 500 for training for predicting an object position. The method 500 may be performed by an electronic device (e.g., electronic device 102 described in connection with FIG. 1). The method 500 may include training a velocity model for object position prediction from landmarks of a previous frame and/or for tracking. For example, the method 500 may be a training approach in order to obtain a velocity model (e.g., $M(l_{k-1})$) and/or weights (e.g., w) that may be utilized for object position prediction (e.g., face bounding box prediction). In some configurations, the method 500 and/or one or more steps thereof may be included in the method 200 described in connection with FIG. 2.

The electronic device 102 may generate 502 initial shape positions. For example, the electronic device 102 may generate 502 initial landmarks (e.g., $l_{k-1}^1$). In some configurations, the electronic device 102 may generate 502 the initial landmarks based on one or more probability distributions of landmark positions. For example, the electronic device 102 may utilize a function that randomly generates deformed landmark positions based on the one or more probability distributions (e.g., a global translation distribution, a global scale distribution and/or local motion distributions). In some configurations, this may be accomplished as described in connection with FIGS. 6-7.

The electronic device 102 may compute 504 an object descriptor. The object descriptor may be computed 504 based on the shape positions (e.g., landmarks). For example, the electronic device 102 may compute 504 the object descriptor $\Phi(l_{k-1}^j)$ at every iteration j until it converges. One example of the object descriptor is HSG. Other examples of the object descriptor include HOG, SIFT, Hough transform, SURF and GLOH.

The electronic device 102 may solve 506 a velocity model. For example, the electronic device 102 may solve 506 $M(l_{k-1}{}^j)$. In some configurations, the velocity model may be solved 506 as $$\min_{M(l_{k-1})} \|M(l_{k-1}) \cdot \Phi(l_{k-1}) + l_{k-1} - l_k\|_2^2 + \gamma\|M(l_{k-1}) - M^*(l_{k-1})\|_2^2$$

as described above in connection with Equation (3) in an iterative manner until convergence. In this case, for each iteration j, a velocity model $M(l_{k-1}{}^j)$ may be computed.

The electronic device 102 may update 508 landmarks in each iteration. For example, the electronic device 102 may update 508 the landmarks position in each iteration in accordance with Equation (6).

$$l_k = l_{k-1}{}^{j+1} = l_{k-1}{}^j + \Delta l_{k-1}{}^j \qquad (6)$$

As used herein, $\Delta l_{k-1}{}^j$ is the displacement vector of the landmarks obtained by $M(l_{k-1}{}^j) \cdot \Phi(l_{k-1}{}^j)$. In some configurations, the displacement vector may be obtained in accordance with Equation (2) above for the object prediction module 112. The displacement vector may be obtained in accordance with Equation (5) above for the object measurement module (e.g., landmark measurement module 108). For example, two forms of training may be performed and/or utilized in accordance with the systems and methods disclosed herein: one for object position prediction and one for landmark measurement.

The electronic device 102 may determine 510 whether a function (e.g., the object descriptor $\Phi(l_{k-1}{}^j)$ has converged. For example, the electronic device 102 may determine 510 whether the function converged if the displacement vector $\Delta l_{k-1}{}^j$ is lower than a predefined threshold (e.g., less than 5% change).

In a case that the function has not converged, the electronic device 102 may return to compute 504 the object descriptor for the next iteration (e.g., $M(l_{k-1}{}^{j+1})$. For example, the object descriptor may be computed 504 with the updated landmarks (where j is incremented, e.g., j=j+1, j++, etc.). As illustrated in FIG. 5, computing 504 the object descriptor, solving 506 the velocity model and updating 508 the landmarks may be iterated until the function converges.

In a case that the function has converged, the electronic device 102 may compute 512 weights (e.g., a model weight value). For example, the electronic device 102 may compute weights in accordance with Equation (7).

$$w = \frac{1}{std(l_k - l_k^*)} \qquad (7)$$

In Equation (7), $std(l_k - l_k^*)$ denotes a standard deviation function of the estimated landmarks $l_k$ from the annotated values $l_k^*$ used in the training process. The set of velocity models (e.g., $M(l_{k-1}{}^j)$) and/or the weights (e.g., w) may be applied in object position prediction as described in connection with one or more of FIGS. 1-4. In some configurations, the electronic device 102 described in connection with FIG. 1 may perform the method 500. In other configurations, a separate electronic device (e.g., computer) may perform the method 500 and/or may provide the training results (e.g., the set of velocity models $M(l_{k-1}{}^j)$ and/or the weights w) to the electronic device 102. In some configurations, the method 500 may be performed "offline" (e.g., before performing one or more of the methods 200, 300, 400 described in connection with FIGS. 2-4, before runtime, etc.).

Figure 6:
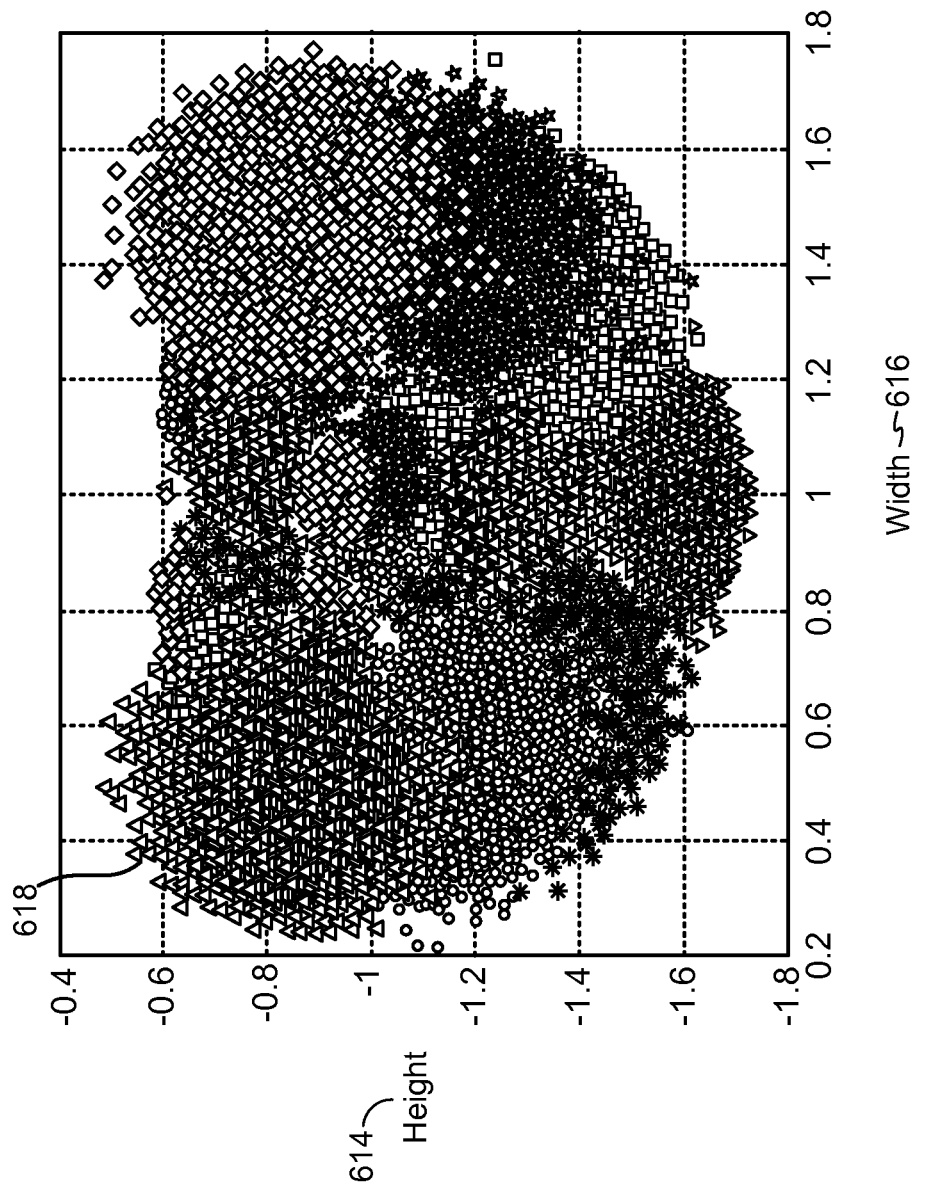
FIG. 6 includes a graph that illustrates distributions of a set of landmarks.

FIG. 6 includes a graph that illustrates distributions of a set of landmarks. Distributions of sets of landmarks may also be referred to as soft statistics of shape dynamics. The graph is illustrated in width 616 and height 614 (which may relate to units such as pixels, inches, millimeters, etc.). The graph provides an example of object local motion initialization for each landmark in training (e.g., the movement possibility of each landmark with respect to the other landmarks of the object). For example, the object (e.g., face) motion initialization may include global translation, global scale and/or conditional local motion of each landmark specified by FIG. 6. Specifically, each group of points illustrated in the graph illustrates the local motion (e.g., statistical variation) of a landmark (corresponding to a facial structure) that may occur in a sequence of images (e.g., video). For example, the group of points 618 illustrated on the upper-left portion of the graph (illustrated as triangles) illustrates the local motion of a landmark that corresponds to the top intersection of an ear and a face. Other groups of symbols (e.g., circles, asterisks, triangles, inverted triangles, diamonds, stars and squares) represent the distributions of other landmarks.

In some configurations, the global translation of the landmarks may be modeled as a Gaussian distribution (with 15% standard deviation, for example). The global scale of the landmarks may be modeled as a Gaussian distribution (with 5% standard deviation, for example). The local motion of landmarks may be characterized with statistics of shapes' dynamics as illustrated in FIG. 6. In particular, a model that is based on soft statistics may be utilized in accordance with the systems and methods disclosed herein. The model may reflect statistical distributions of local motion for landmarks that correspond to a deformation of a structure (e.g., a facial structure, a shape, etc.). For example, each of the groups of points illustrated in FIG. 6 provides a conditional probability distribution with respect to each other. This is distinct from known approaches that assume hard constraints like active shape and/or appearance models. The probability distributions (e.g., standard deviations and/or conditional distributions) of each of the landmarks may be used to generate a shape deformation (using Monte Carlo analysis, for example). For instance, a function based on the probability distributions may be utilized to randomly deform the landmarks.

FIG. 7 includes three examples 720a-c that illustrate landmark motion. In particular, FIG. 7 illustrates one approach for object (e.g., face) motion initialization for training. In each of the examples 720a-c, the circular points illustrate an annotated ground truth for a set of landmarks (e.g., $l_k^*$). In each of the examples 720a-c, the diamond points illustrate different shape positions for a set of landmarks that are generated based on the probability distributions of the landmarks (as described in connection with FIG. 6, for example). In example A 720a, it can be observed that the landmark positions are to the left of and below the corresponding ground truth landmarks. In example B 720b, it can be observed that the landmark positions are to the right of and above the corresponding ground truth landmarks. In example C 720c, it can be observed that the landmark positions are to the left of the corresponding ground truth landmarks. These landmark positions may be generated by a function that randomly deforms the landmarks based on the probability distributions of the landmarks described above. In addition, it can be observed that in any of the examples 720a-c, the shape has not only displaced but also deformed according to the soft statistics that are shown in FIG. 6.

Figure 8:
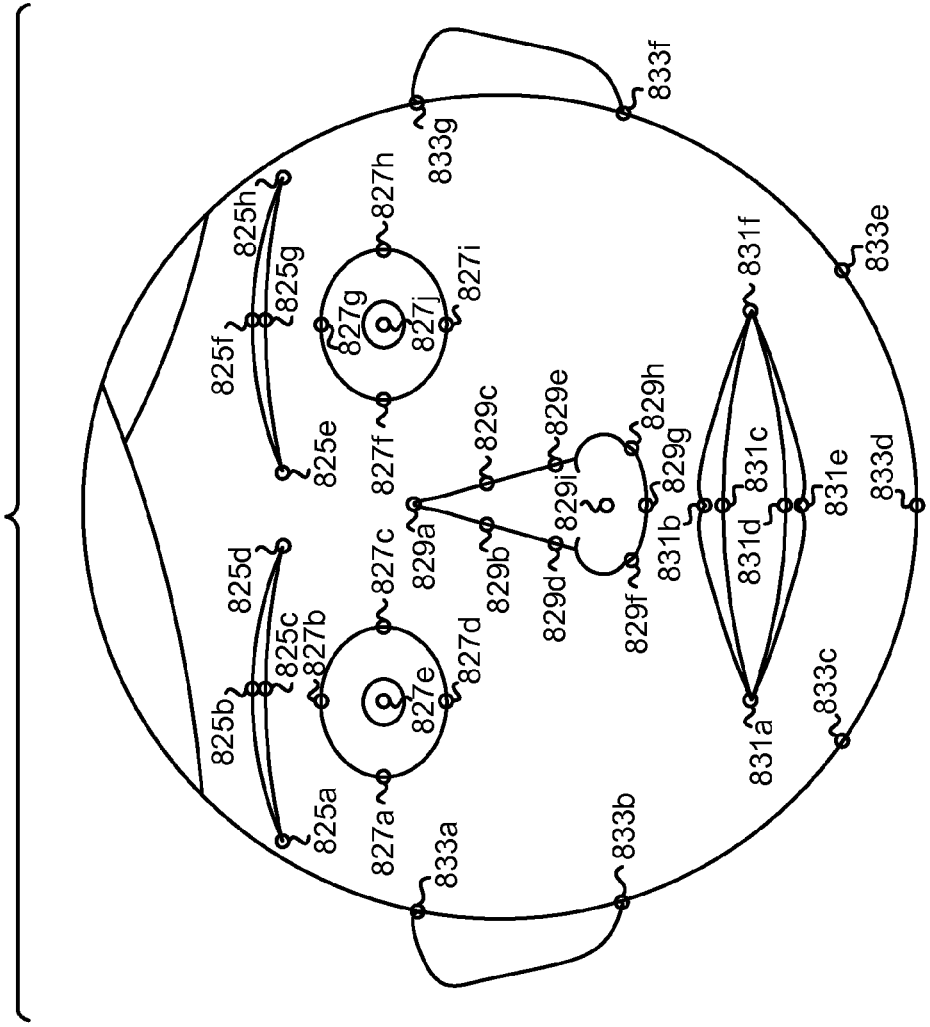
FIG. 8 includes a landmark diagram.

FIG. 8 includes a landmark diagram 824. In particular, FIG. 8 provides examples of landmarks 825a-h, 827a-j, 829a-i, 831a-f, 833a-g on a facial structure. In some configurations, prediction of a face bounding box may be accomplished as follows. For an online landmark predictor and assuming n training iterations, landmark prediction at each frame may be expressed as illustrated in Equation (8).

$$l_k = l_{k-1} + \sum_{j=1}^{n} \Delta l_{k-1}^j \quad (8)$$

A face bounding box position $p_k$ and length $s_k$ may be determined in accordance with Equations (9)-(10).

$$p_k = \begin{bmatrix} x_p \\ y_p \end{bmatrix} = w^T \cdot l_k = \begin{bmatrix} w_x^T & 0 \\ 0 & w_y^T \end{bmatrix} \cdot \begin{bmatrix} x_1 \\ \vdots \\ x_N \\ y_1 \\ \vdots \\ y_N \end{bmatrix} \quad (9)$$

$$s_k = \frac{1}{2} \cdot \sum_{i=1}^{N} \sqrt{(x_i - x_p)^2 + (y_i - y_p)^2} \quad (10)$$

As used herein, $x_p$ may be a pixel position in a first dimension (e.g., in a horizontal dimension), $y_p$ may be a pixel position in a second dimension (e.g., in a vertical dimension). It should be noted that w may be estimated from the distribution of training error of each landmark (as described above, for example).

The landmark diagram 824 illustrates a set of landmarks 825a-h, 827a-j, 829a-i, 831a-f, 833a-g corresponding to a facial structure. For example, a set of landmarks may include one or more landmarks 825a-h corresponding to eyebrows, one or more landmarks 827a-j corresponding to eyes, one or more landmarks 829a-i corresponding to a nose, one or more landmarks 831a-f corresponding to lips/mouth and/or one or more landmarks 833a-g corresponding to a facial contour (e.g., cheeks, chin, ears, etc.). For instance, one landmark 833a corresponds to the upper intersection between the ear and face on the left side of the landmark diagram 824. It should be noted that each landmark may have an associated weight (e.g., normalized weight). In some configurations, contour landmarks 833a-g (e.g., landmarks 833a-g on the periphery of the facial structure) may be the least reliable and accordingly may be associated with the lowest weights. It should be noted that although FIG. 8 illustrates one example of landmarks, fewer, more and/or different landmarks may be utilized in accordance with the systems and methods disclosed herein.

Figure 9:
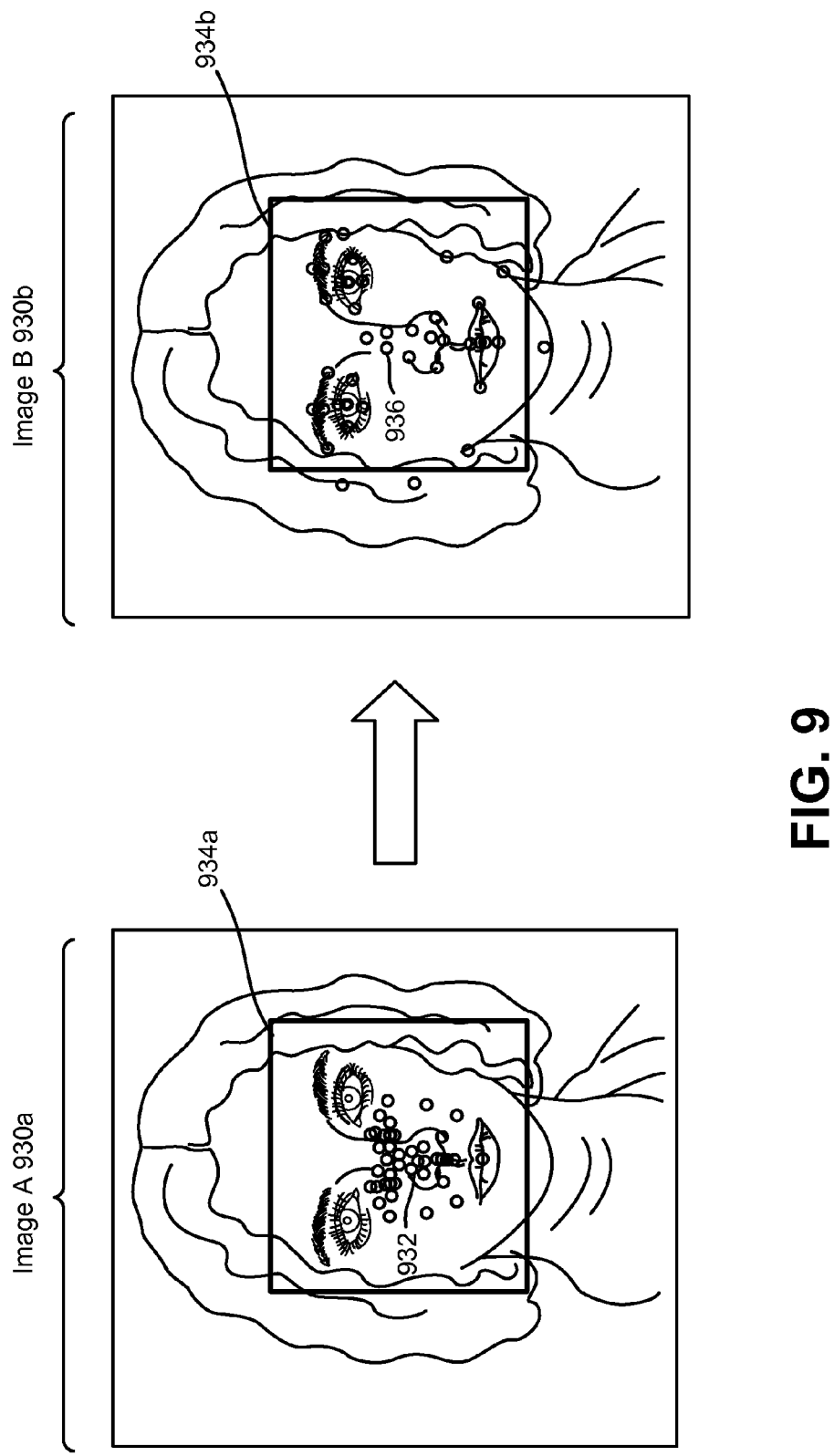
FIG. 9 is a diagram illustrating one example of landmarks measurement based on a predicted object position or a bounding box obtained from an object detector.

FIG. 9 is a diagram illustrating one example of landmarks measurement based on a predicted object position or a bounding box obtained from an object detector. In particular, FIG. 9 illustrates one example of measuring landmarks on a face based on a predicted bounding box. As described above in connection with FIG. 1 (e.g., Equation (5)), facial landmarks may be measured starting from a mean shape 932. Specifically, a mean shape 932 for a set of landmarks is illustrated in the bounding box 934a in image A 930a. The non-linear displacement model described above in connection with Equation (5) may be utilized for landmarks measurement. As illustrated in image B 930b, the landmarks 936 are measured corresponding to the correct locations on the face. The bounding box 934b is also illustrated in image B 930b.

Figure 10:
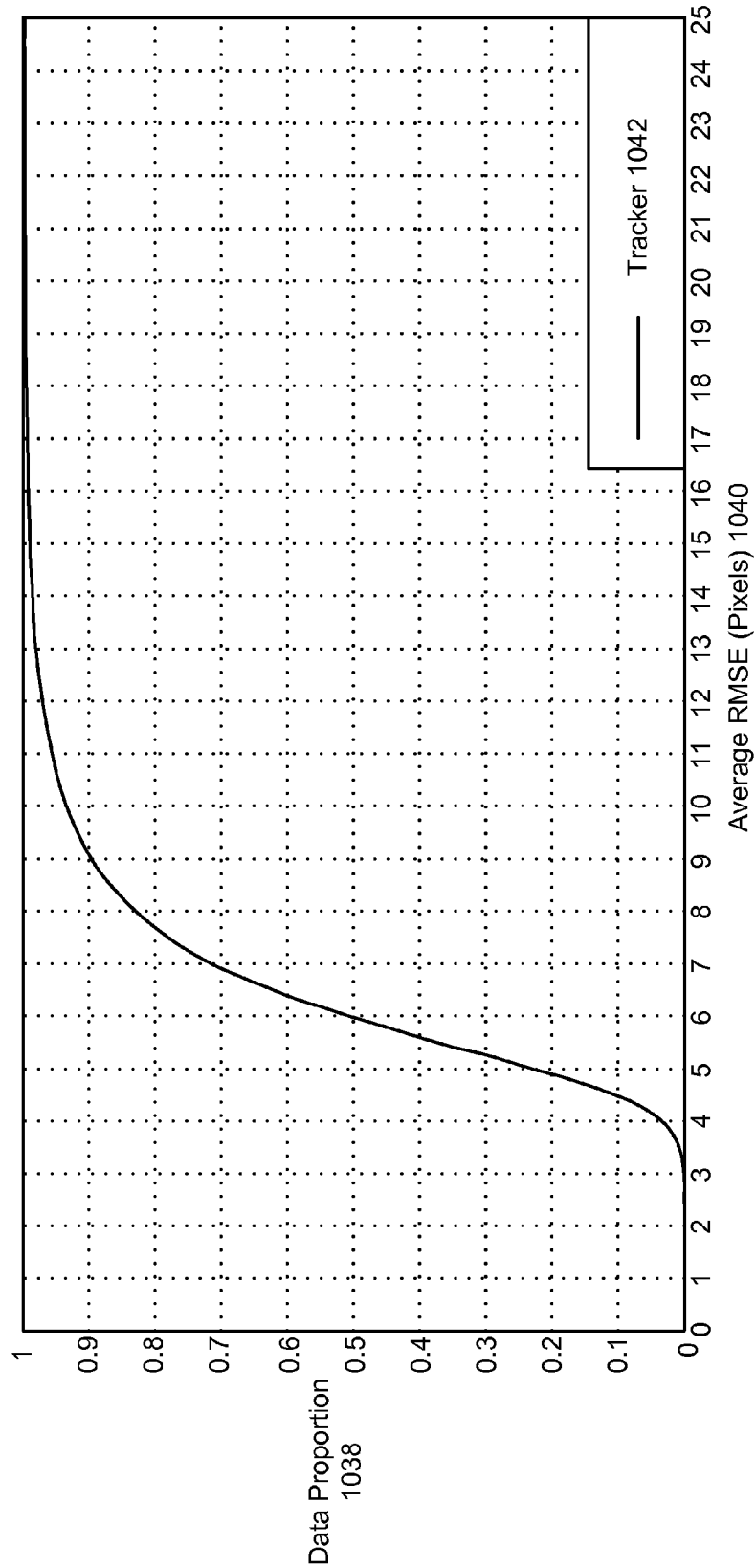
FIG. 10 is a graph illustrating one example of results for validation of the systems and methods disclosed herein.

FIG. 10 is a graph illustrating one example of results for validation of the systems and methods disclosed herein. Specifically, the graph illustrates a cumulative error distribution of a tracker 1042 in accordance with the systems and methods disclosed herein. The vertical axis of the graph represents a data proportion 1038 and the horizontal axis represents a root mean square error (RMSE) in pixels 1040 computed on a 256 by 256 face scale (in pixels, for example).

The accuracy of the tracker 1042 may exceeds that of other approaches. In this example, results were obtained using a 2-Fold cross validation on annotated training images. Regarding speed, one example of the systems and methods disclosed herein took approximately 20 milliseconds (ms) per face on average in a C implementation (with a 2.6 gigahertz (GHz) processor and 8 gigabytes (GB) of random access memory (RAM)), for example. In this example, six iterations were used for prediction and four iterations were used for measurement.

Figure 11:
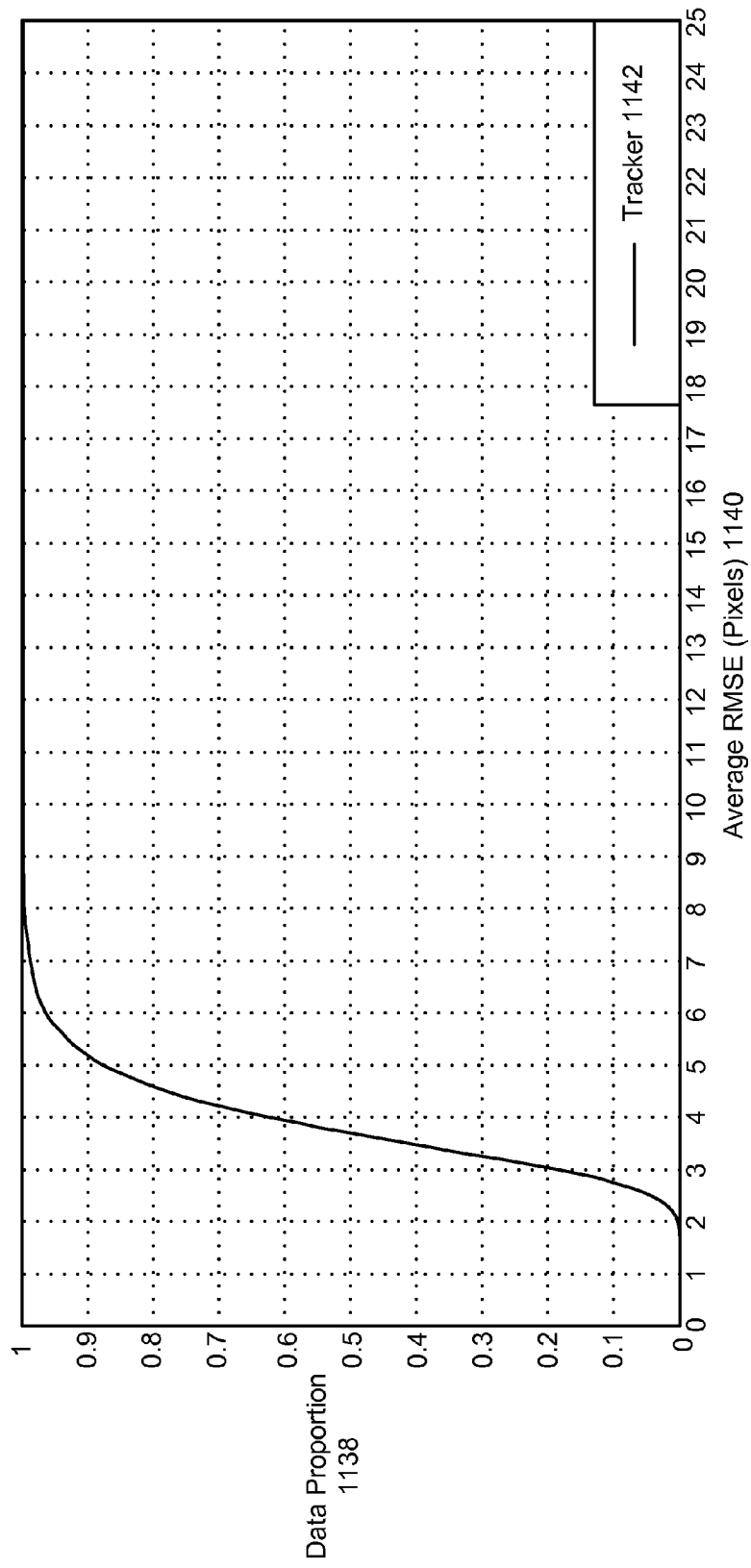
FIG. 11 is a graph illustrating one example of results for a blind test of the systems and methods disclosed herein.

FIG. 11 is a graph illustrating one example of results for a blind test of the systems and methods disclosed herein. Specifically, the graph illustrates a cumulative distribution error of a blind test of online videos. The graph illustrates the performance of a tracker 1142 in accordance with the systems and methods disclosed herein. The vertical axis of the graph represents a data proportion 1138 and the horizontal axis represents an RMSE in pixels 1140 (e.g., pixels of 12 landmark points) computed on a 256 by 256 face scale (in pixels, for example).

The accuracy of the tracker 1142 may exceed that of other approaches. In other words, the tracker 1142 exhibited better accuracy in comparison with other approaches. In this example, the platform for testing was a 2.6 GHz processor with 8 GB of RAM. Table (1) provides an example of tracker performance in terms of time and number of missed frames.

TABLE (1)

|  | Time (ms) | Number of Missed Frames out of 8407 |
| --- | --- | --- |
| Tracker | 19.7 | 11 (0.13%) |

One or more distinguishing (e.g., novel) features of the systems and methods disclosed herein in comparison with known approaches are given as follows. The systems and methods disclosed herein may not utilize hard constraints on an object (e.g., object model, face). The systems and methods disclosed herein may not utilize hard constraints on the motion of the landmarks. For example, some known approaches assume hard constraints such as active shape and/or appearance models.

The systems and methods disclosed herein may be applied to detect when tracking is lost. In accordance with the systems and methods disclosed herein, an object detector may only be utilized (e.g., called) when needed (e.g., only when tracking is lost).

In accordance with the systems and methods disclosed herein, object position prediction (e.g., face pose prediction) may be independent from object position detection (e.g., face detection). Some configurations of the systems and methods disclosed herein may be cheap to implement or realize on an embedded system. In some configurations, the systems and methods disclosed herein may utilize an HSG descriptor, which may be two times smaller than SIFT. Regarding speed, one implementation of the systems and methods disclosed herein takes 20 ms/face when implemented in C programming language. This may allow tracking of more than 50 faces/second on a laptop, for example.

Regarding accuracy, the systems and methods disclosed herein may outperform known approaches. For example, in one example of the systems and methods disclosed herein, 60% of data have an average RMSE≤4 pixels. In a known approach, only 40% of data have an average RMSE≤4 pixels.

Figure 12:
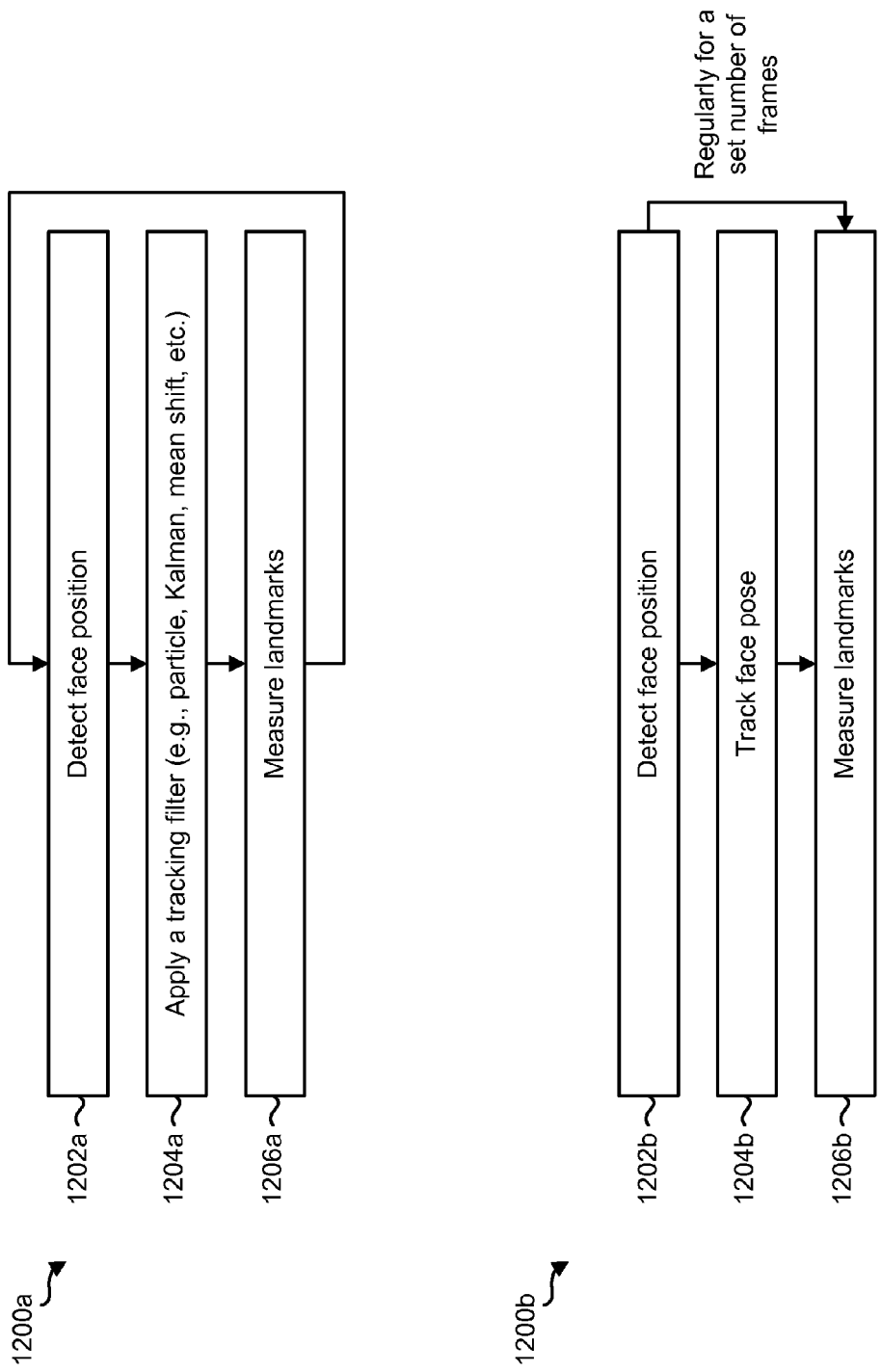
FIG. 12 includes two flow diagrams illustrating known approaches for tracking faces.

FIG. 12 includes two flow diagrams illustrating known approaches 1200a-b for tracking faces. In comparison, the systems and methods disclosed herein are distinct from these known approaches 1200a-b. In a first known approach 1200a, a face position is detected 1202a. Then, a tracking filter (e.g., particle filter, Kalman filter, mean-shift filter, etc.) is applied 1204a. Then, landmarks are measured 1206a. As illustrated in the first known approach 1200a, a face position must be detected in every frame for application of the tracking filter. This is distinct from the systems and methods disclosed herein, where the object position is not detected in frames where tracking is maintained.

In a second known approach 1200b, a face position is detected 1202b. Then, a face pose is tracked 1204b via optical flow. Then, landmarks are measured 1206b. As illustrated in the second known approach 1200b, a face position must be detected regularly for a set number of frames. This is distinct from the systems and methods disclosed herein, where the object position may not be detected (after the initial frame) as long as tracking is maintained.

Figure 13:
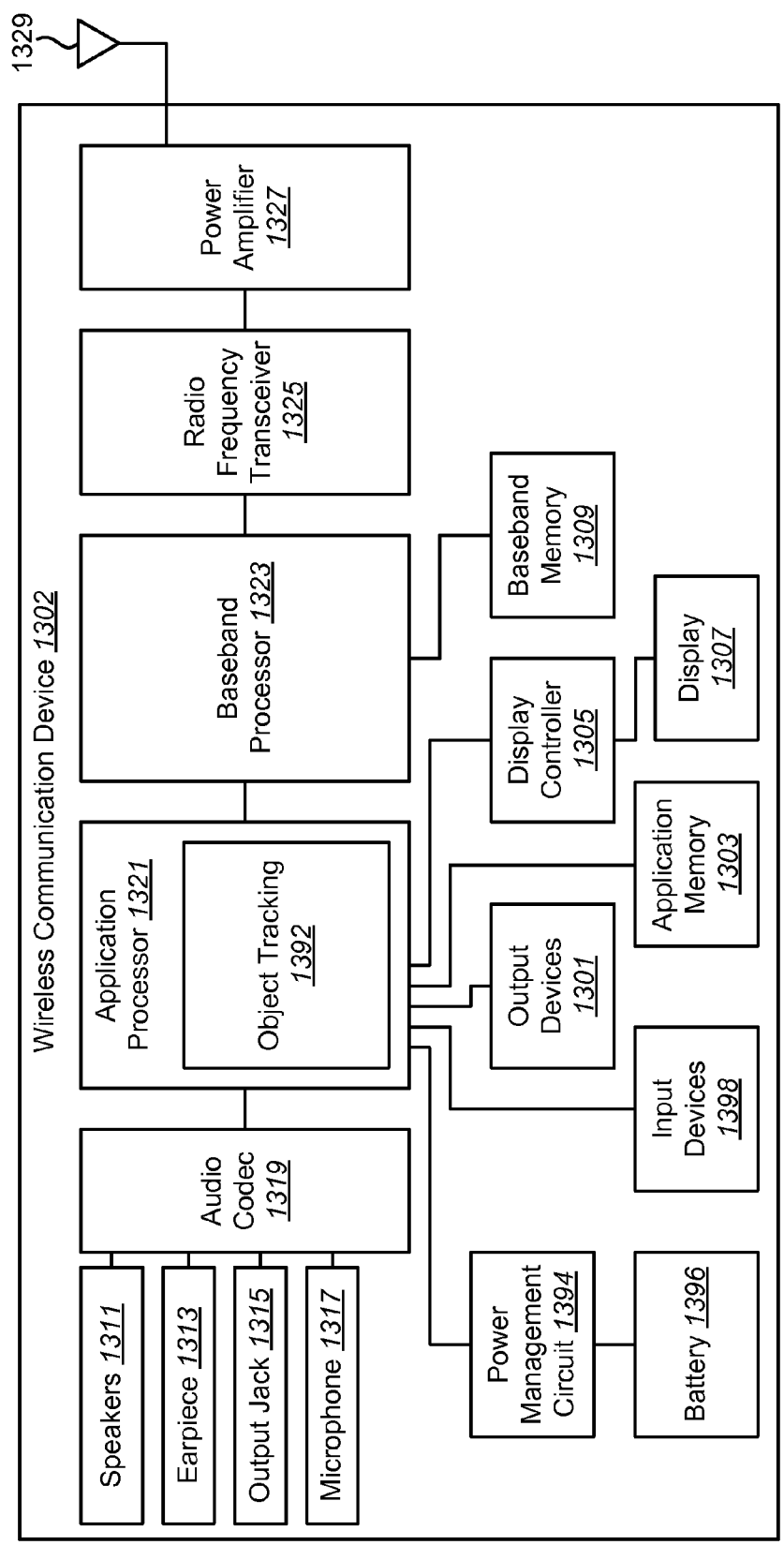
FIG. 13 is a block diagram illustrating one configuration of a wireless communication device in which systems and methods for tracking an object may be implemented.

FIG. 13 is a block diagram illustrating one configuration of a wireless communication device 1302 in which systems and methods for tracking an object may be implemented. The wireless communication device 1302 illustrated in FIG. 13 may be an example of one or more of the electronic devices described herein. The wireless communication device 1302 may include an application processor 1321. The application processor 1321 generally processes instructions (e.g., runs programs) to perform functions on the wireless communication device 1302. In some configurations, the application processor 1321 may include an object tracking module 1392. The object tracking module 1392 may include one or more of the modules described in connection with FIG. 1 and/or may perform one or more of the functions, procedures or steps described in connection with FIGS. 1-9. For example, the object tracking module 1392 may implement one or more of the methods 200, 300, 400, 500, 1500 described in connection with one or more of FIGS. 2-5 and 15. In some configurations, the object tracking module 1392 may be implemented separately from the application processor 1321. The application processor 1321 may be coupled to an audio coder/decoder (codec) 1319.

The audio codec 1319 may be used for coding and/or decoding audio signals. The audio codec 1319 may be coupled to at least one speaker 1311, an earpiece 1313, an output jack 1315 and/or at least one microphone 1317. The speakers 1311 may include one or more electro-acoustic transducers that convert electrical or electronic signals into acoustic signals. For example, the speakers 1311 may be used to play music or output a speakerphone conversation, etc. The earpiece 1313 may be another speaker or electro-acoustic transducer that can be used to output acoustic signals (e.g., speech signals) to a user. For example, the earpiece 1313 may be used such that only a user may reliably hear the acoustic signal. The output jack 1315 may be used for coupling other devices to the wireless communication device 1302 for outputting audio, such as headphones. The speakers 1311, earpiece 1313 and/or output jack 1315 may generally be used for outputting an audio signal from the audio codec 1319. The at least one microphone 1317 may be an acousto-electric transducer that converts an acoustic signal (such as a user's voice) into electrical or electronic signals that are provided to the audio codec 1319.

The application processor 1321 may also be coupled to a power management circuit 1394. One example of a power management circuit 1394 is a power management integrated circuit (PMIC), which may be used to manage the electrical power consumption of the wireless communication device 1302. The power management circuit 1394 may be coupled to a battery 1396. The battery 1396 may generally provide electrical power to the wireless communication device 1302. For example, the battery 1396 and/or the power management circuit 1394 may be coupled to at least one of the elements included in the wireless communication device 1302.

The application processor 1321 may be coupled to at least one input device 1398 for receiving input. Examples of input devices 1398 include infrared sensors, image sensors, accelerometers, touch sensors, keypads, etc. The input devices 1398 may allow user interaction with the wireless communication device 1302. The application processor 1321 may also be coupled to one or more output devices 1301. Examples of output devices 1301 include printers, projectors, screens, haptic devices, etc. The output devices 1301 may allow the wireless communication device 1302 to produce output that may be experienced by a user.

The application processor 1321 may be coupled to application memory 1303. The application memory 1303 may be any electronic device that is capable of storing electronic information. Examples of application memory 1303 include double data rate synchronous dynamic random access memory (DDRAM), synchronous dynamic random access memory (SDRAM), flash memory, etc. The application memory 1303 may provide storage for the application processor 1321. For instance, the application memory 1303 may store data and/or instructions for the functioning of programs that are run on the application processor 1321.

The application processor 1321 may be coupled to a display controller 1305, which in turn may be coupled to a display 1307. The display controller 1305 may be a hardware block that is used to generate images on the display 1307. For example, the display controller 1305 may translate instructions and/or data from the application processor 1321 into images that can be presented on the display 1307. Examples of the display 1307 include liquid crystal display (LCD) panels, light emitting diode (LED) panels, cathode ray tube (CRT) displays, plasma displays, etc.

The application processor 1321 may be coupled to a baseband processor 1323. The baseband processor 1323 generally processes communication signals. For example, the baseband processor 1323 may demodulate and/or decode received signals. Additionally or alternatively, the baseband processor 1323 may encode and/or modulate signals in preparation for transmission.

The baseband processor 1323 may be coupled to baseband memory 1309. The baseband memory 1309 may be any electronic device capable of storing electronic information, such as SDRAM, DDRAM, flash memory, etc. The baseband processor 1323 may read information (e.g., instructions and/or data) from and/or write information to the baseband memory 1309. Additionally or alternatively, the baseband processor 1323 may use instructions and/or data stored in the baseband memory 1309 to perform communication operations.

The baseband processor 1323 may be coupled to a radio frequency (RF) transceiver 1325. The RF transceiver 1325 may be coupled to a power amplifier 1327 and one or more antennas 1329. The RF transceiver 1325 may transmit and/or receive radio frequency signals. For example, the RF transceiver 1325 may transmit an RF signal using a power amplifier 1327 and at least one antenna 1329. The RF transceiver 1325 may also receive RF signals using the one or more antennas 1329.

Figure 14:
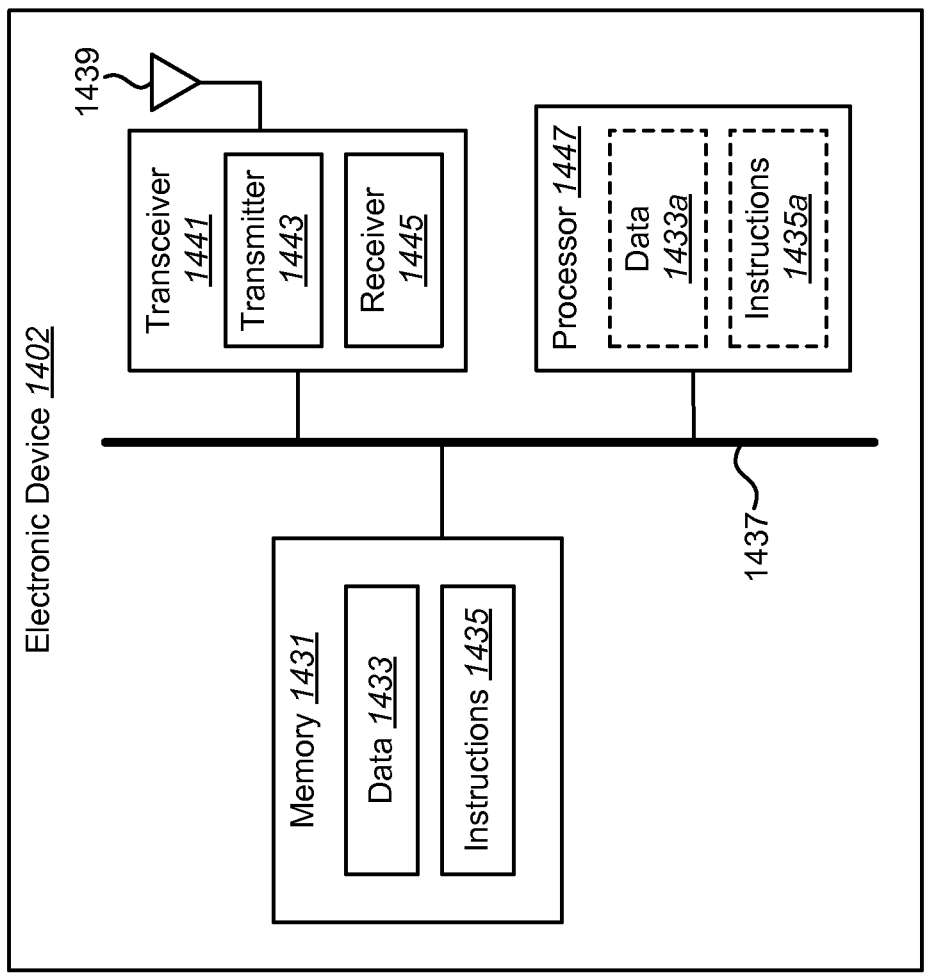
FIG. 14 illustrates certain components that may be included within an electronic device.

FIG. 14 illustrates certain components that may be included within an electronic device 1402. The electronic device 1402 described in connection with FIG. 14 may be an example of and/or may be implemented in accordance with one or more of the electronic devices described herein.

The electronic device 1402 includes a processor 1447. The processor 1447 may be a general purpose single- or multi-chip microprocessor (e.g., an ARM), a special purpose microprocessor (e.g., a digital signal processor (DSP)), a microcontroller, a programmable gate array, etc. The processor 1447 may be referred to as a central processing unit (CPU). Although just a single processor 1447 is shown in the electronic device 1402 of FIG. 14, in an alternative configuration, a combination of processors (e.g., an ARM and DSP) could be used.

The electronic device 1402 also includes memory 1431 in electronic communication with the processor 1447 (i.e., the processor 1447 can read information from and/or write information to the memory 1431). The memory 1431 may be any electronic component capable of storing electronic information. The memory 1431 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1433 and instructions 1435 may be stored in the memory 1431. The instructions 1435 may include one or more programs, routines, sub-routines, functions, procedures, code, etc. The instructions 1435 may include a single computer-readable statement or many computer-readable statements. The instructions 1435 may be executable by the processor 1447 to implement one or more of the methods described herein. Executing the instructions 1435 may involve the use of the data 1433 that is stored in the memory 1431. FIG. 14 shows some instructions 1435a and data 1433a being loaded into the processor 1447.

The electronic device 1402 may also include a transmitter 1443 and a receiver 1445 to allow transmission and reception of signals between the electronic device 1402 and a remote location (e.g., a wireless communication device, a base station, etc.). The transmitter 1443 and receiver 1445 may be collectively referred to as a transceiver 1441. An antenna 1439 may be electrically coupled to the transceiver 1441. The electronic device 1402 may also include (not shown) multiple transmitters, multiple receivers, multiple transceivers and/or multiple antenna.

The various components of the electronic device 1402 may be coupled together by one or more buses, which may include a power bus, a control signal bus, a status signal bus, a data bus, etc. For simplicity, the various buses are illustrated in FIG. 14 as a bus system 1437.

Figure 15:
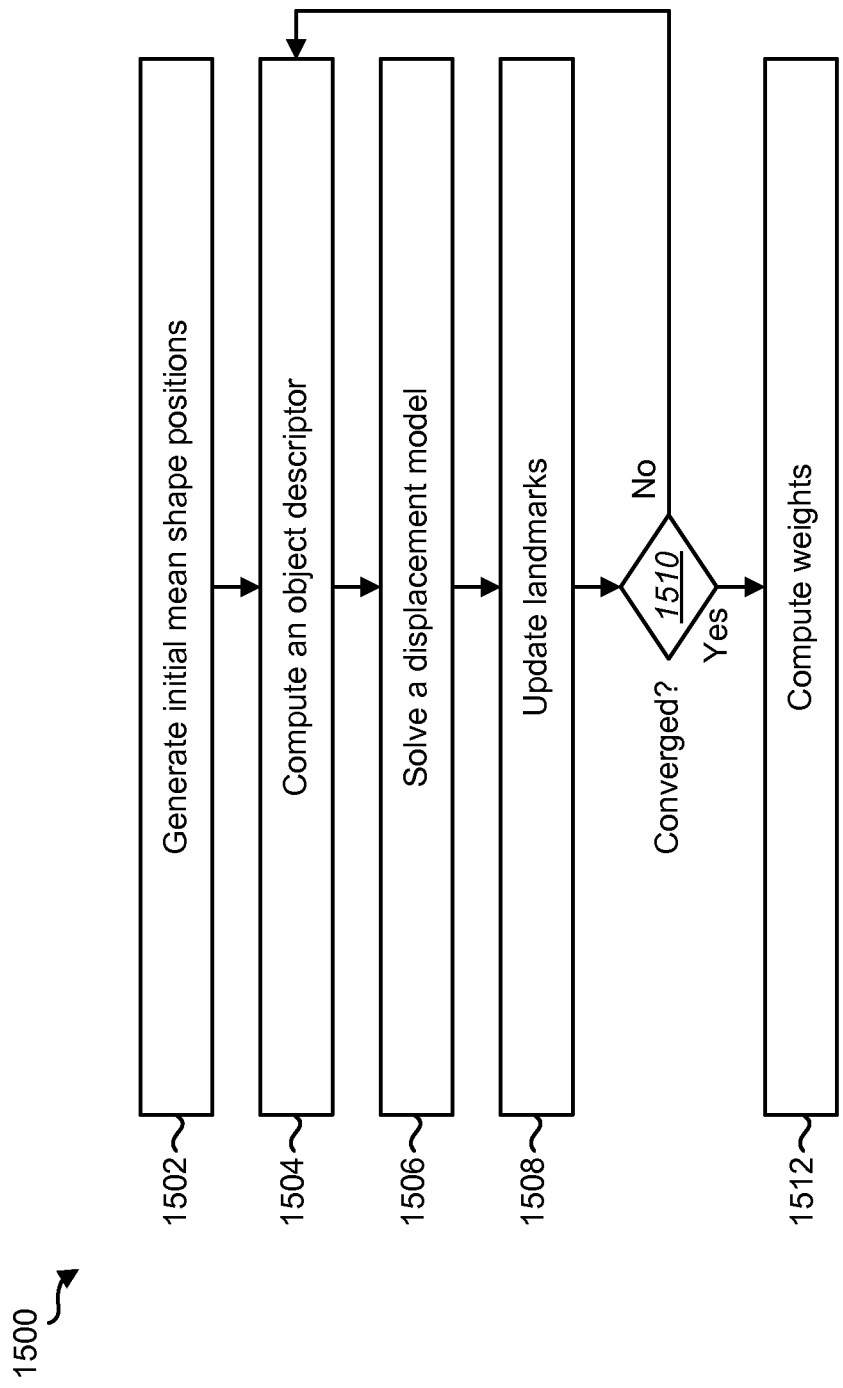
FIG. 15 is a flow diagram illustrating one configuration of a method for training a displacement model for landmark measurement.

FIG. 15 is a flow diagram illustrating one configuration of a method 1500 for training a displacement model for landmark measurement. The method 1500 may be performed by an electronic device (e.g., the electronic device 102 described in connection with FIG. 1). The method 1500 may include training a displacement model for landmark measurement. For example, the method 1500 may be a training approach in order to obtain a displacement model (e.g., $U(l_k)$) and/or weights (e.g., ω) that may be utilized for landmark measurement. In some configurations, the method 1500 and/or one or more steps thereof may be included in the method 200 described in connection with FIG. 2.

The electronic device 102 may generate 1502 initial mean shape positions. For example, the electronic device 102 may generate 1502 a mean shape (e.g., $l_{k,ms}$) based on an object position (e.g., bounding box). The landmarks may start from the means shape within the same frame. In some configurations, the electronic device 102 may generate 1502 the mean shape based on one or more probability distributions of landmark positions. For example, each of the initial landmarks of the mean shape (e.g., $l_{k,ms}$) may be a mean (e.g., average) of a probability distribution corresponding to that landmark. One example of a mean shape is given in image A 930a of FIG. 9.

The electronic device 102 may compute 1504 an object descriptor (e.g., $\Phi(l_{k,ms})$). The object descriptor may be computed 1504 based on the landmark positions. For example, the electronic device 102 may compute 1504 the object descriptor $\Phi(l_{k,ms})$ until it converges. One example of the object descriptor is HSG. Other examples of the object descriptor include HOG, SIFT, Hough transform, SURF and GLOH.

The electronic device 102 may solve 1506 a displacement model. For example, the electronic device 102 may solve 1506 $U(l_{k,ms})$. In some configurations, the displacement model may be solved 1506 in a similar approach to that given for the velocity model in connection with Equation (3) in an iterative manner until convergence. In this case, for each iteration (e.g., i), a displacement model $U(l_{k,ms})$ may be computed.

The electronic device 102 may update 1508 landmarks in each iteration. For example, the electronic device 102 may update 1508 the landmarks position in each iteration i in accordance with Equation (11).

$$l_k = l_k^{i+1} = l_k^i + \Delta l_k^i \quad (11)$$

As used herein, $\Delta l_k^i$ is the displacement vector of the landmarks obtained by $U(l_{k,ms}) - \Phi(l_{k,ms})$. In some configurations, the displacement vector may be obtained in accordance with Equation (5) above for the object measurement module (e.g., landmark measurement module 108).

The electronic device 102 may determine 1510 whether a function (e.g., the object descriptor $\Phi(l_{k,ms})$) has converged. For example, the electronic device 102 may determine 1510 whether the function converged if the displacement vector $\Delta l_k$ is lower than a predefined threshold (e.g., less than 5% change).

In a case that the function has not converged, the electronic device 102 may return to compute 1504 the object descriptor for the next iteration (e.g., $U(l_k^{i+1})$). For example, the object descriptor may be computed 1504 with the updated landmarks (where i is incremented, e.g., i=i+1, i++, etc.). As illustrated in FIG. 15, computing 1504 the object descriptor, solving 1506 the displacement model and updating 1508 the landmarks may be iterated until the function converges.

In a case that the function has converged, the electronic device 102 may compute 1512 weights (e.g., a model weight value). For example, the electronic device 102 may compute weights in accordance with Equation (12).

$$\omega = \frac{1}{std(l_k - l_k^*)} \quad (12)$$

In Equation (12), $std(l_k-l_k^*)$ denotes a standard deviation function of the estimated landmarks $l_k$ from the annotated values $l_k^*$ used in the training process. The set of displacement models (e.g., $U(l_k^i)$) and/or the weights (e.g., $\omega$) may be applied in landmark measurement as described in connection with one or more of FIGS. 1-4. In some configurations, the electronic device 102 described in connection with FIG. 1 may perform the method 1500. In other configurations, a separate electronic device (e.g., computer) may perform the method 1500 and/or may provide the training results (e.g., the set of displacement models $U(l_k^i)$ and/or the weights $\omega$) to the electronic device 102. In some configurations, the method 1500 may be performed "offline" (e.g., before performing one or more of the methods 200, 300, 400 described in connection with FIGS. 2-4, before runtime, etc.).

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise Random-Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for tracking an object by an electronic device, comprising:
   detecting an object position in an initial frame to produce a detected object position;
   determining one or more landmark positions based on the detected object position or a predicted object position;
   training a velocity model for object position prediction from landmarks of a previous frame, wherein the training comprises:
      iteratively solving the velocity model until a displacement vector of the landmarks is lower than a predefined threshold;
   predicting the object position in a subsequent frame based on the velocity model and the one or more landmark positions;
   determining whether object tracking is lost in a current frame; and
   avoiding performing object detection for the subsequent frame in response to object tracking being maintained for the current frame.

2. The method of claim 1, wherein the landmark positions are within a structure of the object.

3. The method of claim 1, wherein object position detection and object position prediction are independent.

4. The method of claim 1, wherein predicting the object position is based on one or more landmark positions from a previous frame.

5. The method of claim 1, wherein a structure of the landmark positions is predefined.

6. The method of claim 1, wherein determining whether object tracking is lost is based on at least one of one or more landmark positions and object position prediction.

7. The method of claim 1, wherein a velocity model is utilized during prediction and a displacement model is utilized while determining the one or more landmark positions, and wherein each of the velocity model and displacement model corresponds to a structure of the object.

8. The method of claim 7, wherein the velocity model and the displacement model do not include any hard constraints.

9. The method of claim 1, wherein the method operates on one frame at a time of a single image sequence.

10. The method of claim 1, further comprising training a displacement model for determining the one or more landmark positions from a predicted bounding box position at a current frame or from a detected bounding box position at the current frame.

11. An electronic device for tracking an object, comprising:
a processor;
memory in electronic communication with the processor; and
instructions stored in the memory, the instructions being executable by the processor to:
detect an object position in an initial frame to produce a detected object position;
determine one or more landmark positions based on the detected object position or a predicted object position;
train a velocity model for object position prediction from landmarks of a previous frame, wherein the instructions being executable to train comprise instructions being executable to:
iteratively solve the velocity model until a displacement vector of the landmarks is lower than a predefined threshold;
predict the object position in a subsequent frame based on the velocity model and the one or more landmark positions;
determine whether object tracking is lost in a current frame; and
avoid performing object detection for the subsequent frame in response to object tracking being maintained for the current frame.

12. The electronic device of claim 11, wherein the landmark positions are within a structure of the object.

13. The electronic device of claim 11, wherein object position detection and object position prediction are independent.

14. The electronic device of claim 11, wherein predicting the object position is based on one or more landmark positions from a previous frame.

15. The electronic device of claim 11, wherein a structure of the landmark positions is predefined.

16. The electronic device of claim 11, wherein determining whether object tracking is lost is based on at least one of one or more landmark positions and object position prediction.

17. The electronic device of claim 11, wherein a velocity model is utilized during prediction and a displacement model is utilized while determining the one or more landmark positions, and wherein each of the velocity model and displacement model corresponds to a structure of the object.

18. The electronic device of claim 17, wherein the velocity model and the displacement model do not include any hard constraints.

19. The electronic device of claim 11, wherein the electronic device operates on one frame at a time of a single image sequence.

20. The electronic device of claim 11, wherein the instructions are further executable by the processor to train a displacement model for determining the one or more landmark positions from a predicted bounding box position at a current frame or from a detected bounding box position at the current frame.

21. A computer-program product for tracking an object, comprising a non-transitory tangible computer-readable medium having instructions thereon, the instructions comprising:
code for causing an electronic device to detect an object position in an initial frame to produce a detected object position;
code for causing the electronic device to determine one or more landmark positions based on the detected object position or a predicted object position;
code for causing the electronic device to train a velocity model for object position prediction from landmarks of a previous frame, wherein the code for causing the electronic device to train a velocity model comprises:
code for causing the electronic device to iteratively solve the velocity model until a displacement vector of the landmarks is lower than a predefined threshold;
code for causing the electronic device to predict the object position in a subsequent frame based on the velocity model and the one or more landmark positions;
code for causing the electronic device to determine whether object tracking is lost in a current frame; and
code for causing the electronic device to avoid performing object detection for the subsequent frame in response to object tracking being maintained for the current frame.

22. The computer-program product of claim 21, wherein the landmark positions are within a structure of the object.

23. The computer-program product of claim 21, wherein object position detection and object position prediction are independent.

24. The computer-program product of claim 21, wherein the code for causing the electronic device to predict the object position is based on one or more landmark positions from a previous frame.

25. An apparatus for tracking an object, comprising:
means for detecting an object position in an initial frame to produce a detected object position;
means for determining one or more landmark positions based on the detected object position;
means for training a velocity model for object position prediction from landmarks of a previous frame, wherein the means for training comprise:
means for iteratively solving the velocity model until a displacement vector of the landmarks is lower than a predefined threshold;
means for predicting the object position in a subsequent frame based on the velocity model and the one or more landmark positions;
means for determining whether object tracking is lost in a current frame; and means for avoiding performing object detection for the subsequent frame in response to object tracking being maintained for the current frame.

26. The apparatus of claim 25, wherein the landmark positions are within a structure of the object.

27. The apparatus of claim 25, wherein object position detection and object position prediction are independent.

28. The apparatus of claim 25, wherein the means for predicting the object position is based on one or more landmark positions from a previous frame.

* * * * *